United States Patent
Bergström et al.

(10) Patent No.: US 12,256,258 B2
(45) Date of Patent: Mar. 18, 2025

(54) RRC SEGMENTATION AND QoE

(71) Applicant: Telefonaktiebolaget LM Ericsson (publ), Stockholm (SE)

(72) Inventors: Mattias Bergström, Sollentuna (SE); Cecilia Eklöf, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 334 days.

(21) Appl. No.: 17/790,316

(22) PCT Filed: Apr. 14, 2021

(86) PCT No.: PCT/SE2021/050341
§ 371 (c)(1),
(2) Date: Jun. 30, 2022

(87) PCT Pub. No.: WO2021/211042
PCT Pub. Date: Oct. 21, 2021

(65) Prior Publication Data
US 2023/0044291 A1   Feb. 9, 2023

Related U.S. Application Data

(60) Provisional application No. 63/011,000, filed on Apr. 16, 2020.

(51) Int. Cl.
*H04W 24/10*   (2009.01)
*H04W 48/12*   (2009.01)

(52) U.S. Cl.
CPC ........... *H04W 24/10* (2013.01); *H04W 48/12* (2013.01)

(58) Field of Classification Search
CPC ..... H04W 76/10; H04W 76/27; H04W 24/10; H04W 80/02; H04W 8/24; H04W 48/12; H04W 28/06; H04W 72/20
See application file for complete search history.

(56) References Cited

U.S. PATENT DOCUMENTS

2019/0363843 A1 * 11/2019 Gordaychik ............. H04L 1/08
2020/0196376 A1 *  6/2020 Kim ..................... H04W 28/065

FOREIGN PATENT DOCUMENTS

| WO | 2015115825 A1 | 8/2015 |
| WO | 2019019007 A1 | 1/2019 |
| WO | 2021067149 A1 | 4/2021 |

OTHER PUBLICATIONS

Author Unknown, "Technical Specification Group Radio Access Network; NR and Evolved Universal Terrestrial Radio Access (E-UTRA); Study on optimizations of UE radio capability signalling; (Release 16)," Technical Report 37.873, Version 16.0.0, Mar. 2019, 3GPP Organizational Partners, 16 pages.

(Continued)

*Primary Examiner* — Peter Chen
(74) *Attorney, Agent, or Firm* — Withrow & Terranova, PLLC

(57) ABSTRACT

Methods for communicating a Quality of Experience (QoE) measurement are provided. In embodiments disclosed herein, a wireless device communicates the QoE measurement to a base station based on Radio Resource Control (RRC) segmentation. In this regard, the wireless device receives an indication that indicates whether the base station can support the RRC segmentation. Accordingly, the wireless device transmits the QoE measurement to the base station based on the RRC segmentation if the indication indicates that the base station can support the RRC segmentation. By transmitting the QoE measurement based on the RRC segmentation, the wireless device can communicate more QoE information to the base station in a larger QoE measurement file (e.g., 8000 kilobytes).

11 Claims, 14 Drawing Sheets

(56) References Cited

OTHER PUBLICATIONS

Author Unknown, "Technical Specification Group Radio Access Network; Radio Resource Control (RRC); Protocol specification (Release 15)," Technical Specification 25.331, Version 15.4.0, Sep. 2018, 3GPP Organizational Partners, 2,318 pages.

Author Unknown, "Technical Specification Group Services and System Aspects; IP Multimedia Subsystem (IMS); Multimedia Telephony; Media handling and interaction (Release 16)," Technical Specification 26.114, Version 16.4.0, Dec. 2019, 3GPP Organizational Partners, 440 pages.

Author Unknown, "Technical Specification Group Services and System Aspects; Transparent end-to-end Packet-switched Streaming Service (PSS); Progressive Download and Dynamic Adaptive Streaming over http (3GP-DASH) (Release 16)," Technical Specification 26.247, Version 16.2.0, Dec. 2019, 3GPP Organizational Partners, 139 pages.

Author Unknown, "Technical Specification Group Core Network and Terminals; AT command set for User Equipment (UE) (Release 16)," Technical Specification 27.007, Version 16.3.0, Dec. 2019, 3GPP Organiational Partners 399 pages.

Author Unknown, "Technical Specification Group Core Network and Terminals; AT command set for User Equipment (UE) (Release 16)," Technical Specification 27.007, Version 16.4.0, Mar. 2020, 399 pages.

Author Unknown, "Technical Specification Group Radio Access Network; Evolved Universal Terrestrial Radio Access (E-UTRA); Radio Resource Control (RRC); Protocol specification (Release 15)," Technical Specification 36.331, Version 15.8.0, Dec. 2019, 3GPP Organizational Partners, 964 pages.

Author Unknown, "Technical Speciication Group Radio Access Network; Evolved Universal Terrestrial Radio Access (E-UTRA); Radio Resource Control (RRC); Protocol specification (Release 15)," Technical Specification 36.331, Version 15.9.0, Mar. 2020, 3GPP Organizational Partners, 964 pages.

Author Unknown, "Technical Specification Group Radio Access Network; NR; Radio Resource Control (RRC) protocol specification (Release 15)," Technical Specification 38.331, Version 15.8.0, Dec. 2019, 3GPP Organizational Partners, 532 pages.

Author Unknown, "Technical Specification Group Radio Access Network; NR; Radio Resource Control (RRC) protocol specification (Release 15)," Technical Specification 38.331, Version 15.9.0, Mar. 2020, 3GPP Organizational Partners, 536 pages.

Ericsson, "R2-1704740: Clarification of UE capability for QoE Measurement Collection for streaming services," 3GPP TSG-RAN2 Meeting #98, May 15-19, 2017, Hangzhou, China, 4 pages.

Ericsson, "R2-2101271: Solution for QoE Management," 3GPP TSG RAN WG2 #113, Jan. 25-Feb. 5, 2021, Electronic Meeting, 3 pages.

International Search Report and Written Opinion for International Patent Application No. PCT/SE2021/050341, mailed Jul. 5, 2021, 15 pages.

\* cited by examiner

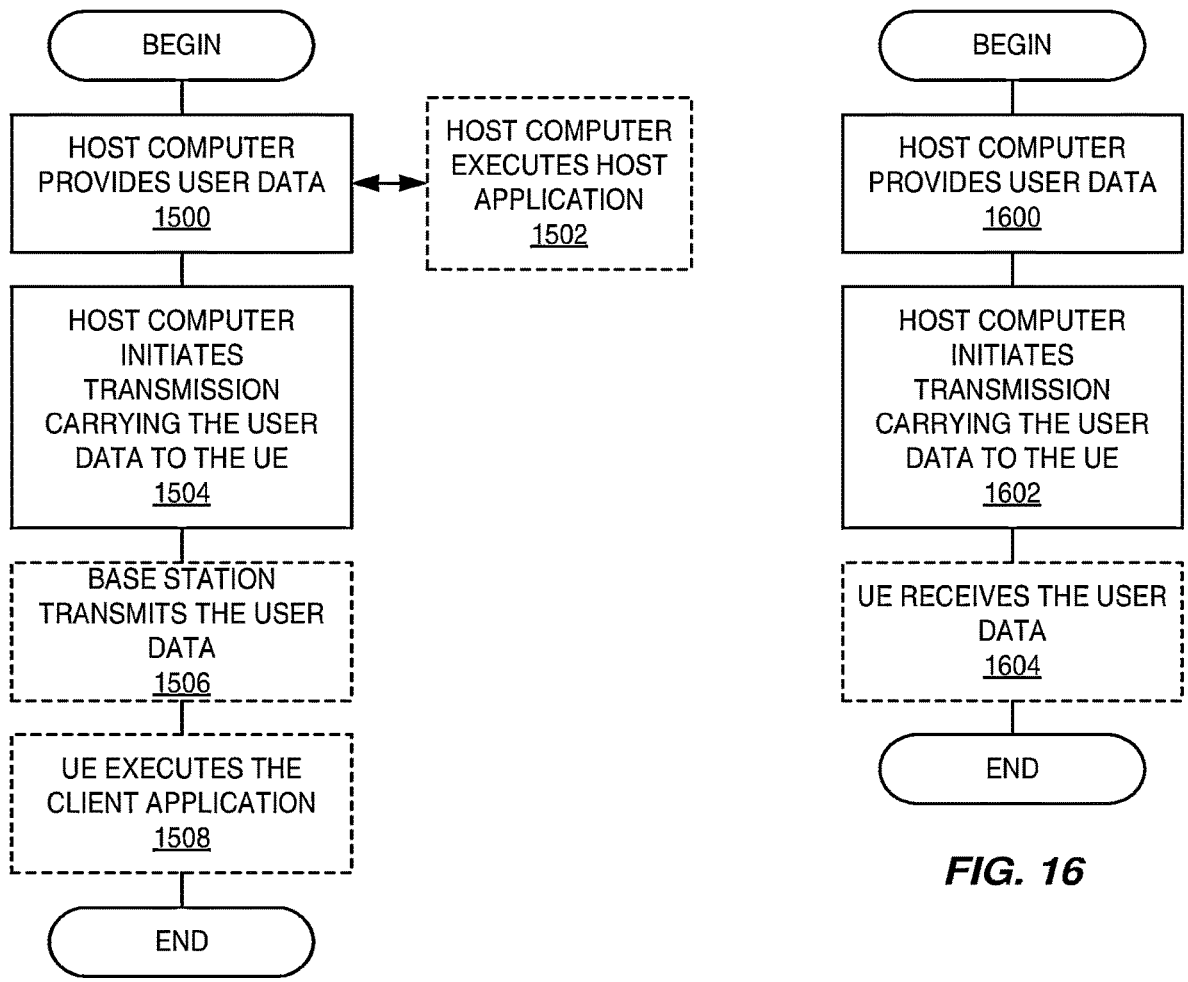

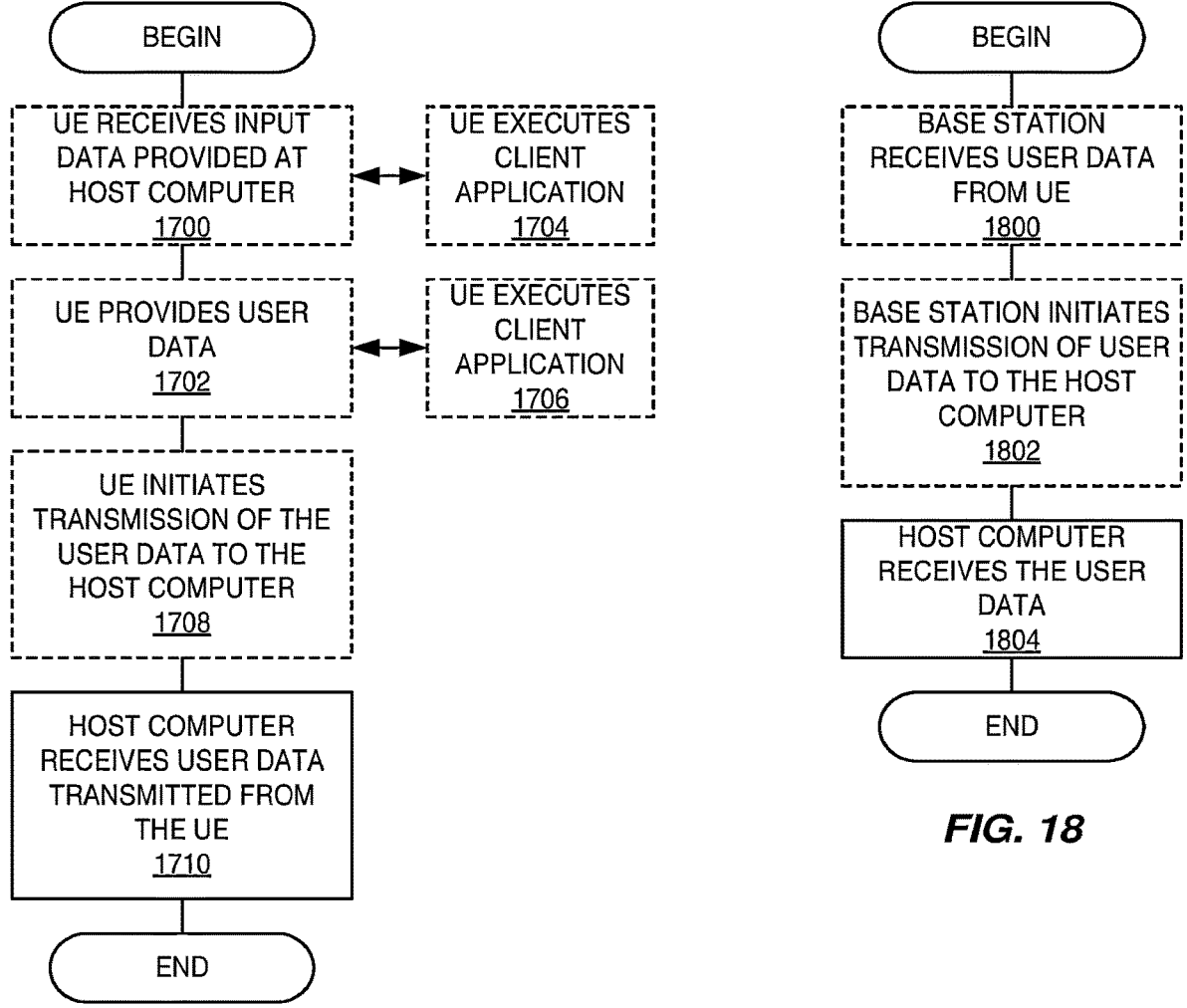

RRC SEGMENTATION AND QoE

RELATED APPLICATIONS

This application claims the benefit of provisional patent application Ser. No. 63/011,000, filed Apr. 16, 2020, the disclosure of which is hereby incorporated herein by reference in its entirety.

This application is a 35 U.S.C. § 371 national phase filing of International Application No. PCT/SE2021/050341, filed Apr. 14, 2021, which claims the benefit of provisional patent application Ser. No. 63/011,000, filed Apr. 16, 2020, the disclosures of which are hereby incorporated herein by reference in their entireties.

TECHNICAL FIELD

The technology of the disclosure relates generally to transmission of Quality of Experience (QoE) measurement results.

BACKGROUND

Quality of Experience (QoE)

Quality of Experience (QoE) measurements have been specified for Long Term Evolution (LTE) and Universal Mobile Telecommunications System (UMTS). The purpose of application layer measurements is to measure the end user experience when using certain applications. Currently QoE measurements for streaming services and for MTSI services are supported in LTE.

The solutions in LTE and UMTS are similar with the overall principles as follows. QoE Measurement Collection enables configuration of the application layer measurements in a User Equipment (UE) and transmission of QoE measurement result files by means of Radio Resource Control (RRC) signaling. Application layer measurement configuration received from Operations, Administration, and Management (OAM) or Core Network (CN) is encapsulated in a transparent container, which is forwarded to the UE in a downlink RRC message. The application layer measurements received from the UE's higher layer are encapsulated in a transparent container and sent to the network in an uplink RRC message. The resulting container is forwarded to a Trace Collector Entity (TCE). FIG. 1 is a flow diagram providing an exemplary signaling flow for collecting QoE measurement in LTE. In FIG. 1, the RRC signaling flow for QoE measurements in LTE is shown.

In LTE, the message MeasReportAppLayer is used for transmission of the QoE measurement result file, see extract from the RRC specification TS 36.331:

MeasReportAppLayer

The MeasReportAppLayer message is used for sending an application layer measurement report.

Signalling radio bearer: SRB4
RLC-SAP: AM
Logical channel: DCCH
Direction: UE to E-UTRAN MeasReportAppLayer Message

```
-- ASN1START
MeasReportAppLayer-r15 ::=          SEQUENCE {
    criticalExtensions              CHOICE {
        measReportAppLayer-r15          MeasReportAppLayer-r15-IEs,
        criticalExtensionsFuture        SEQUENCE { }
    }
}
MeasReportAppLayer-r15-IEs ::=      SEQUENCE {
    measReportAppLayerContainer-r15     OCTET STRING (SIZE(1..8000))
    OPTIONAL,
    serviceType-r15                     ENUMERATED {qoe, qoemtsi, spare6, spare5,
spare4, spare3, spare2, spare1}         OPTIONAL,
    nonCriticalExtension                SEQUENCE { }          OPTIONAL
}
-- ASN1STOP
```

MeasReportAppLayer field descriptions measReportAppLayerContainer
The field contains container of application layer measurements, see Annex L (normative) in TS 26.247 [90] and clause 16.5 in TS 26.114 [99].
serviceType
Indicates the type of application layer measurement. Value qoe indicates Quality of Experience Measurement Collection for streaming services, value qoemtsi indicates Quality of Experience Measurement Collection for MTSI.

The communication between an access stratum layer (where the RRC messages are transmitted) and the application layer in the UE are done by means of AT commands. The AT commands are specified in 3GPP TS 27.007:

8.78 Application Level Measurement Configuration +CAPPLEVMC

TABLE 8.78-1

| +CAPPLEVMC parameter command syntax | |
|---|---|
| Command | Possible response(s) |
| +CAPPLEVMC=[<n>] | +CME ERROR: <err> |
| +CAPPLEVMC? | +CAPPLEVMC: <n> |
| +CAPPLEVMC=? | +CAPPLEVMC: (list of supported <n>s) |

Description
This command allows control of the application level measurement configuration according to 3GPP TS 25.331 [74] and 3GPP TS 36.331 [86]. The set command controls the presentation of the unsolicited result code +CAPPLEVMC: <app-meas_service_type>,<start-stop_reporting>[,<app-meas_config_file_length>,<app-meas_config-file>] providing data for the configuration. Refer subclause 9.2 for possible <err> values.
Read command returns the current value of <n>.
Test command returns values supported as a compound value.
Defined Values
    <n>: integer type. Disable and enable presentation of the unsolicited result code +CAPPLEVMC to the TE.
      0 Disable presentation of the unsolicited result code
      1 Enable presentation of the unsolicited result code
    <app-meas_service_type>: integer type. Contains the indication of what application that is a target for the application level measurement configuration.
      1 QoE measurement collection for streaming services
      2 QoE measurement collection for MTSI services
    <start-stop_reporting>: integer type. Indicates the start and stop of the application level measurement reporting for the application indicated by the <app-meas_service_ type>.
      0 start the application level measurement reporting
      1 stop the application level measurement reporting
    <app-meas_config_file_length>: integer type. Indicates the number of octets of the <app-meas_config-file> parameter.
    <app-meas_config-file>: string of octets. Contains the application level measurement configuration file for the application indicated by the <app-meas_service_type>. The parameter shall not be subject to conventional character conversion as per +CSCS.
Implementation
Optional.

8.79 Application Level Measurement Report +CAPPLEVMR

TABLE 8.79-1

| +CAPPLEVMR action command syntax | |
|---|---|
| Command | Possible response(s) |
| +CAPPLEVMR=<app-meas_service_type>,<app-meas_report_length>,<app-meas_report> | +CME ERROR: <err> |
| +CAPPLEVMR=? | |

Description
This command allows the MT to provide the application level measurement report according to 3GPP TS 25.331 [74] and 3GPP TS 36.331 [86]. Refer to subclause 9.2 for possible <err> values.
Defined Values
    <app_meas_service_type>: integer type. Contains the indication of what application that is providing the application level measurement report.
      1 QoE measurement collection for streaming services
      2 QoE measurement collection for MTSI services
    <app-meas_report_length>: integer type. Indicates the number of octets of the <app-meas_report> parameter.
    <app-meas_report>: string of octets. Contains the application level measurement configuration file for the application indicated by the <app-meas_service_type>. The parameter shall not be subject to conventional character conversion as per +CSCS.
Implementation
Optional.

RRC Segmentation

Segmentation of RRC messages is being introduced for 3GPP Release 16. This is needed to support transmitting large RRC messages that exceed the PDCP SDU size limit, which is 9000 bytes for NR and 8188 bytes for LTE [3GPP TS 37.873]. Other RATs may have other limits.

It is expected that, for example, RRC messages sent in UL and containing UE Radio Capability signaling may exceed the above described limits. It is also expected that RRC messages sent in DL and containing UE configurations which may also exceed the above limits.

The segmented RRC messages are sent in the RRC messages DLDedicatedMessageSegment and ULDedicatedMessageSegment, see below an extract of the latest Change Requests (CRs) on the RRC specification TS 38.331.

DLDedicatedMessageSegment

The DLDedicatedMessageSegment message is used to transfer one segment of the RRCConnectionResume or RRCConnectionReconfiguration messages.

Signalling radio bearer: SRB1

RLC-SAP: AM

Logical channel: DCCH

Direction: Network to UE

DLDedicatedMessageSegment Message

```
-- ASN1START
DLDedicatedMessageSegment-r16 ::=        SEQUENCE {
    criticalExtensions                   CHOICE {
        dlDedicatedMessageSegment-r16        DLDedicatedMessageSegment-r16-IEs,
        criticalExtensionsFuture             SEQUENCE { }
    }
}
DLDedicatedMessageSegment-r16-IEs ::=    SEQUENCE {
    segmentNumber-r16                        INTEGER (0..4),
    rrc-MessageSeg mentContainer-r16         OCTET STRING,
    rrc-MessageSegmentType-r16               ENUMERATED {notLastSegment,
lastSegment},
    lateNonCriticalExtensions                OCTET STRING    OPTIONAL,
    nonCriticalExtension                     SEQUENCE { }    OPTIONAL
}
-- ASN1STOP
```

| DLDedicatedMessageSegmentfield descriptions |
|---|
| segmentNumber |
| Identifies the sequence number of a segment within the encoded DL DCCH message. The network transmits the segments with continuously increasing segmentNumber order so that the UE's RRC layer may expect to obtain them from lower layers in the correct order. Hence, the UE is not required to perform segment re-ordering on RRC level. |
| rrc-MessageSegmentContainer |
| Includes a segment of the encoded DL DCCH message. The size of the included segment in this container should be small enough so the resulting encoded RRC message PDU is less than or equal to the PDCP SDU size limit. |
| rrc-MessageSegmentType |
| Indicates whether the included DL DCCH message segment is the last segment of the message or not. |

ULDedicatedMessageSegment
The ULDedicatedMessageSegment message is used to transfer segments of the UECapabilityInformation message.
  Signalling radio bearer: SRB1
  RLC-SAP: AM
  Logical channel: DCCH
  Direction: UE to Network ULDedicatedMessageSegment Message

```
-- ASN1START
-- TAG-ULDEDICATEDMESSAGESEGMENT-START
ULDedicatedMessageSegment-r16 ::=            SEQUENCE {
    criticalExtensions                       CHOICE {
        ulDedicatedMessageSegment-r16            ULDedicatedMessageSegment-r16-IEs,
        criticalExtensionsFuture                 SEQUENCE { }
    }
}
ULDedicatedMessageSegment-r16-IEs ::=        SEQUENCE {
    segmentNumber-r16                            INTEGER (0..15),
    rrc-MessageSegmentContainer-r16              OCTET STRING,
    segmentEndIndication-r16                     ENUMERATED {true}    OPTIONAL,
    lateNonCriticalExtension                     OCTET STRING         OPTIONAL,
    nonCriticalExtension                         SEQUENCE { }         OPTIONAL
}
-- TAG-ULDEDICATEDMESSAGESEGMENT-STOP
-- ASN1STOP
```

| ULDedicatedMessageSegmentfield descriptions |
| --- |
| segmentNumber
Identifies the sequence number of a segment within the encoded UL DCCH message.
rrc-MessageSegmentContainer
Includes a segment of the encoded UL DCCH message. The size of the included segment in this container should be small enough that the resulting encoded RRC message PDU is less than or equal to the PDCP SDU size limit.
segmentEndIndication
Indicates whether the included UL DCCH message segment is the last segment or not. |

SUMMARY

Embodiments disclosed herein include methods for communicating a Quality of Experience (QoE) measurement. In embodiments disclosed herein, a wireless device communicates the QoE measurement to a base station based on Radio Resource Control (RRC) segmentation. In this regard, the wireless device receives an indication that indicates whether the base station can support the RRC segmentation. Accordingly, the wireless device transmits the QoE measurement to the base station based on the RRC segmentation if the indication indicates that the base station can support the RRC segmentation. By transmitting the QoE measurement based on the RRC segmentation, the wireless device can communicate more QoE information to the base station in a larger QoE measurement file (e.g., 8000 kilobytes).

In one embodiment, a method performed by a wireless device for communicating a QoE measurement is provided. The method includes receiving, from at least one network node, an indication that indicates whether the at least one network node can support RRC segmentation. The method also includes transmitting, to the at least one network node, a QoE measurement based on RRC segmentation in response to receiving the indication that indicates the at least one network node can support RRC segmentation.

In another embodiment, receiving the indication comprises receiving an explicit indication that indicates whether the at least one network node can support RRC segmentation.

In another embodiment, the explicit indication comprises one or more of: an indication received inside a QoE configuration container; and an indication received outside the QoE configuration container and in a message used by the at least one network node to send a QoE measurement configuration to the wireless device.

In another embodiment, receiving the explicit indication comprises forwarding the indication received outside the QoE configuration container from the access stratum layer in the wireless device to an application layer in the wireless device.

In another embodiment, receiving the indication comprises receiving an implicit indication that indicates whether the at least one network node can support RRC segmentation.

In another embodiment, the implicit indication comprises one or more of: a QoE measurement configuration file received from the at least one network node based on RRC segmentation; and an indication provided from the wireless device to the at least one network node that indicates that the wireless device supports RRC segmentation and QoE measurement.

In another embodiment, transmitting the QoE measurement comprises one or more of: determining a permitted size of the QoE measurement; and truncating the QoE measurement to the permitted size.

In another embodiment, transmitting the QoE measurement comprises one or more of: employing a QoE measurement buffer of a first size if the indication indicates that the at least one network node can support RRC segmentation; and employing the QoE measurement buffer of a second size smaller than the first size if the indication indicates that the at least one network node does not support RRC segmentation indicating an adjustment to a size of the QoE measurement buffer from the access stratum layer in the wireless device to the application layer in the wireless device.

In another embodiment, transmitting the QoE measurement comprises one or more of: discarding the QoE measurement in response to a contradiction related to transmitting the QoE measurement based on RRC segmentation; transmitting a subset of the QoE measurement in response to the contradiction related to transmitting the QoE measurement based on RRC segmentation; and storing the QoE measurement in response to the contradiction related to transmitting the QoE measurement based on RRC segmentation.

In another embodiment, the subset of QoE measurement comprises one of: a latest acquired QoE measurement; and a specific type of the QoE measurement.

In another embodiment, receiving the indication from the at least one network node further comprises receiving the indication from a first network node that indicates the first network node can support RRC segmentation; and transmitting the QoE measurement to the at least one network node further comprises transmitting the QoE measurement to a second network node based on RRC segmentation.

In another embodiment, a wireless device is provided. The wireless device includes processing circuitry configured to cause the wireless device to receive, from at least one network node, an indication that indicates whether the at least one network node can support RRC segmentation. The processing circuitry is also configured to cause the wireless device to transmit, to the at least one network node, the QoE measurement based on RRC segmentation in response to receiving the indication that indicates the at least one network node can support RRC segmentation. The wireless device also includes power supply circuitry configured to supply power to the wireless device.

In another embodiment, the processing circuitry is further configured to cause the wireless device to perform any of the steps performed by the wireless device.

In another embodiment, a method performed by a base station for communicating a QoE measurement is provided. The method includes transmitting, to a wireless device, an indication that indicates whether the base station can support RRC segmentation. The method also includes receiving, from the wireless device, the QoE measurement based on RRC segmentation in response to transmitting the indication that indicates the base station can support RRC segmentation.

In another embodiment, transmitting the indication comprises transmitting an explicit indication that indicates whether the base station can support RRC segmentation.

In another embodiment, the explicit indication comprises one or more of: an indication transmitted inside a QoE configuration container; and an indication transmitted outside the QoE configuration container and in a message used by the base station to send a QoE measurement configuration to the wireless device.

In another embodiment, transmitting the indication comprises transmitting an implicit indication that indicates whether the base station can support RRC segmentation.

In another embodiment, the implicit indication comprises one or more of: a QoE measurement configuration file transmitted to the wireless device based on RRC segmentation; and an indication received from the wireless device that indicates that the wireless device supports RRC segmentation and QoE measurement.

In another embodiment, transmitting the indication to the wireless device further comprises providing an explicit indication to indicate a permitted size of the QoE measurement and/or a number of permitted RRC segments.

In another embodiment, a base station is provided. The base station includes processing circuitry configured to cause the base station to transmit, to a wireless device, an indication that indicates whether the base station can support RRC segmentation. The processing circuitry is also configured to cause the base station to receive, from the wireless device, the QoE measurement based on RRC segmentation in response to transmitting the indication that indicates the base station can support RRC segmentation. The base station also includes power supply circuitry configured to supply power to the base station.

In another embodiment, the processing circuitry is further configured to cause the base station to perform any of the steps performed by the base station.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 15 is a flowchart illustrating a method implemented in the communication system in accordance with one embodiment of the present disclosure;

FIG. 16 is a flowchart illustrating a method implemented in the communication system in accordance with one embodiment of the present disclosure;

FIG. 17 is a flowchart illustrating a method implemented in the communication system in accordance with one embodiment of the present disclosure; and FIG. 18 is a flowchart illustrating a method implemented in the communication system in accordance with one embodiment of the present disclosure.

DETAILED DESCRIPTION

Figure 1:
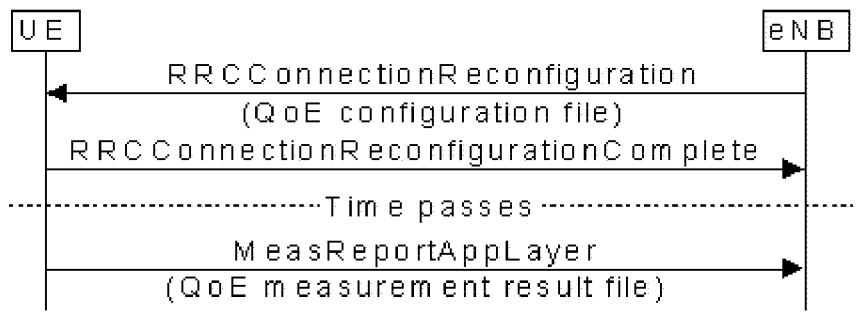
FIG. 1 is a flow diagram providing an exemplary signaling flow for collecting Quality of Experience (QoE) measurement in Long-Term Evolution (LTE)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). Today, Quality of Measurement (QoE) measurement files are limited to be at most 8000 kB in size. This imposes a limit on how many measurements a UE can send to a network and thus limiting the amount of information the network can receive from the UE.

One means to overcome this limitation is to apply Radio Resource Control (RRC) segmentation on QoE measurements that the UE sends to the network. However, the QoE measurements are configured by a layer above the access stratum in the UE, while RRC segmentation is performed in the access stratum. As a result, segmentation cannot be applied efficiently due to separation between the access stratum and the layer above the access stratum. Further, the access network should control whether RRC segmentation can be performed by the UE and the access network in general is separated from a network entity configuring QoE measurements for UEs.

Certain aspects of the present disclosure and their embodiments may provide solutions to the aforementioned or other challenges. Embodiments are provided to allow an access network node to control if and when a UE can apply RRC segmentation for QoE measurements. Exemplary embodiments include:

- a RAN-node indicates to the UE whether RRC segmentation of QoE measurements is allowed
- methods in the UE for determining how large a QoE measurement file the UE can send to the network based on which RAT-type is used
- methods for how a UE can modify the QoE measurement buffers based on how large measurement file can be sent, e.g., considering number of segments, etc.
- how the UE can address contradictions where a node configuring the QoE measurements indicates one thing regarding RRC segmentation support to a UE, while another node (e.g., the node to which the QoE measurements are to be sent to) does not support RRC segmentation
- how the UE sends QoE measurements to the network considering the possibility that RRC segmentation is/is not applied There are, proposed herein, various embodiments which address one or more of the issues disclosed herein. In one embodiment, a method performed by a wireless device for communicating a QoE measurement(s) based on RRC segmentation is provided. The method includes receiving an indication (e.g., in OtherConfig IE of RRCReconfiguration) from a network node indicating whether the network node supports RRC segmentation. The method also includes transmitting a QoE measurement(s) to the network node based on RRC segmentation in response to receiving the indication from the network node indicating that the network node supports RRC segmentation.

In another embodiment, a method performed by a base station for communicating a QoE measurement(s) based on RRC segmentation is provided. The method includes providing an indication (e.g., in OtherConfig IE of RRCReconfiguration) to a wireless device indicating whether the base station supports RRC segmentation. The method also includes receiving a QoE measurement(s) from the wireless device based on RRC segmentation in response to providing the indication to the wireless device indicating that the base station supports RRC segmentation.

Certain embodiments may provide one or more of the following technical advantage(s). When RRC segmentation is used together with QoE measurements, much larger QoE measurement report files can be transmitted. It is useful for the analysis of the files that whole sessions are recorded. When the upper limit of the size is more flexible, it can be more commonly achieved that the files contain whole sessions, which will give more valuable files.

Figure 2:
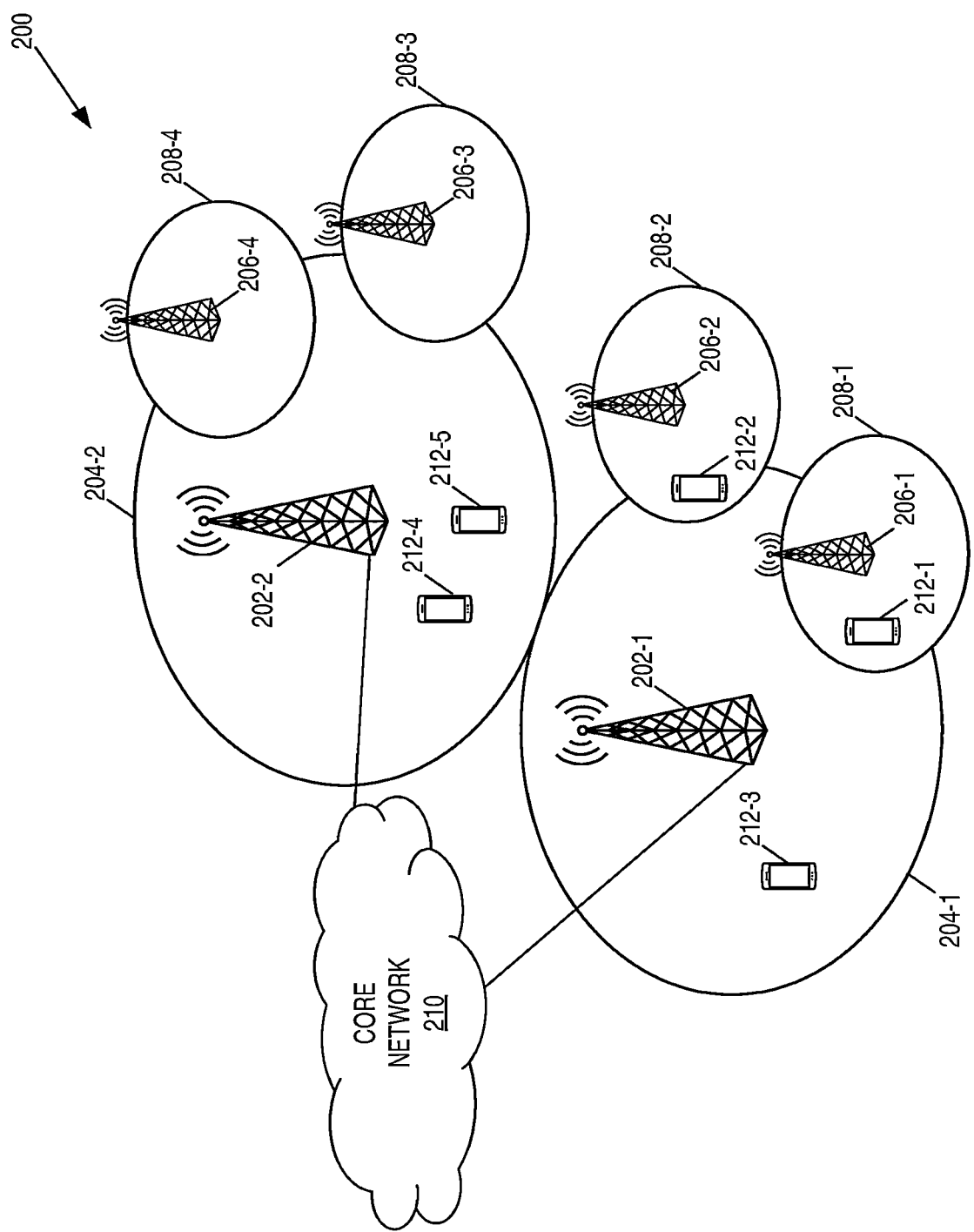
FIG. 2 illustrates one example of a cellular communications system in which embodiments of the present disclosure may be implemented.

FIG. 2 illustrates one example of a cellular communications system 200 in which embodiments of the present disclosure may be implemented. In the embodiments described herein, the cellular communications system 200 is a 5G System (5GS) including a New Radio (NR) Radio Access Network (RAN). In this example, the RAN includes base stations 202-1 and 202-2, which in 5G NR are referred to as gNBs (e.g., LTE RAN nodes connected to 5G Core (5GC), which are referred to as gn-eNBs), controlling corresponding (macro) cells 204-1 and 204-2. The base stations 202-1 and 202-2 are generally referred to herein collectively as base stations 202 and individually as base station 202. Likewise, the (macro) cells 204-1 and 204-2 are generally referred to herein collectively as (macro) cells 204 and individually as (macro) cell 204. The RAN may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The cellular communications system 200 also includes a core network 210, which in the 5GS is referred to as the 5G Core (5GC). The base stations 202 (and optionally the low power nodes 206) are connected to the core network 210.

The base stations 202 and the low power nodes 206 provide service to wireless communication devices 212-1 through 212-5 in the corresponding cells 204 and 208. The wireless communication devices 212-1 through 212-5 are generally referred to herein collectively as wireless communication devices 212 and individually as wireless communication device 212. In the following description, the wireless communication devices 212 are oftentimes UEs, but the present disclosure is not limited thereto.

Figure 3:
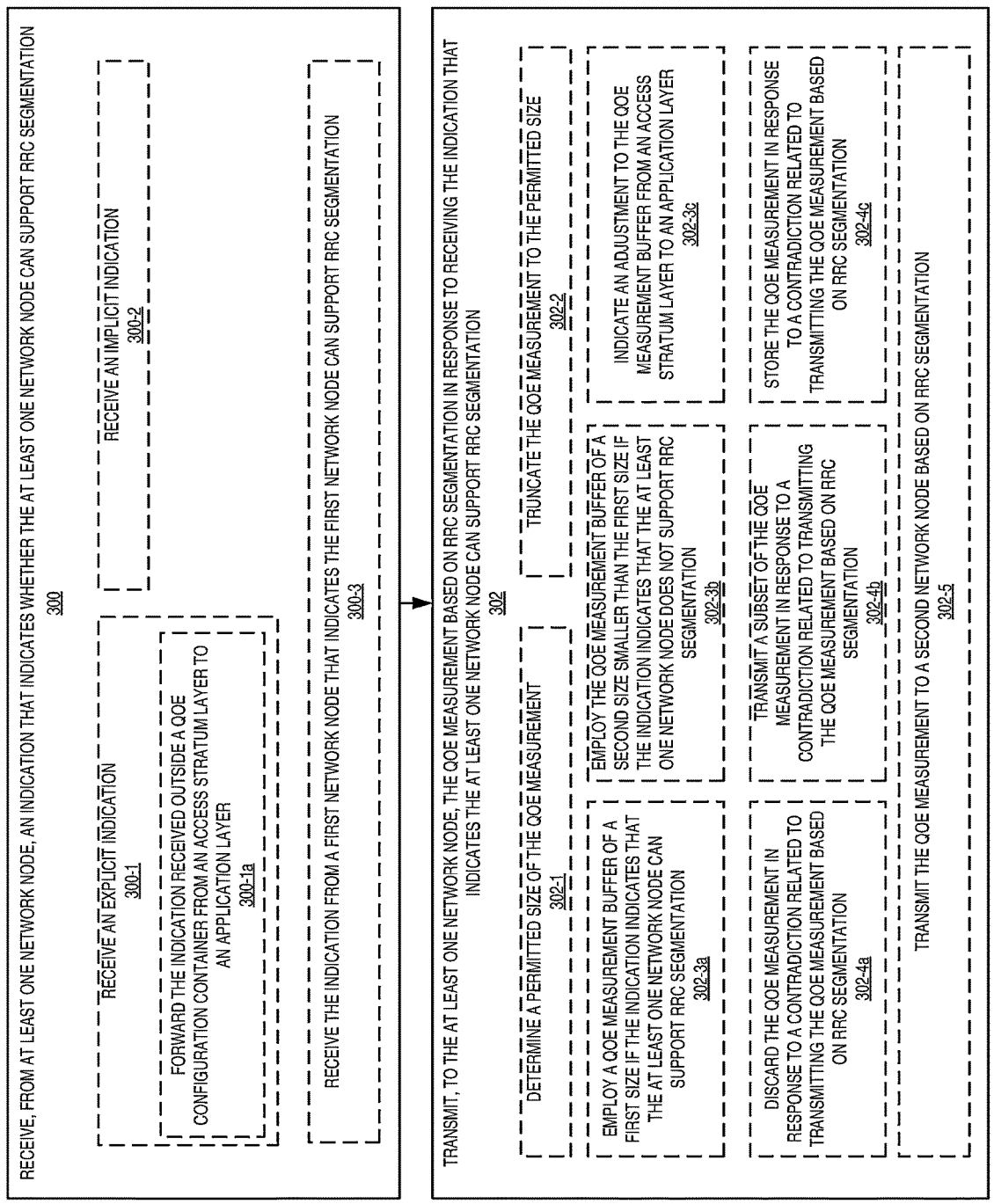
FIG. 3 is a flowchart of an exemplary method performed by a wireless device for communicating a QoE measurement.
Figure 4:
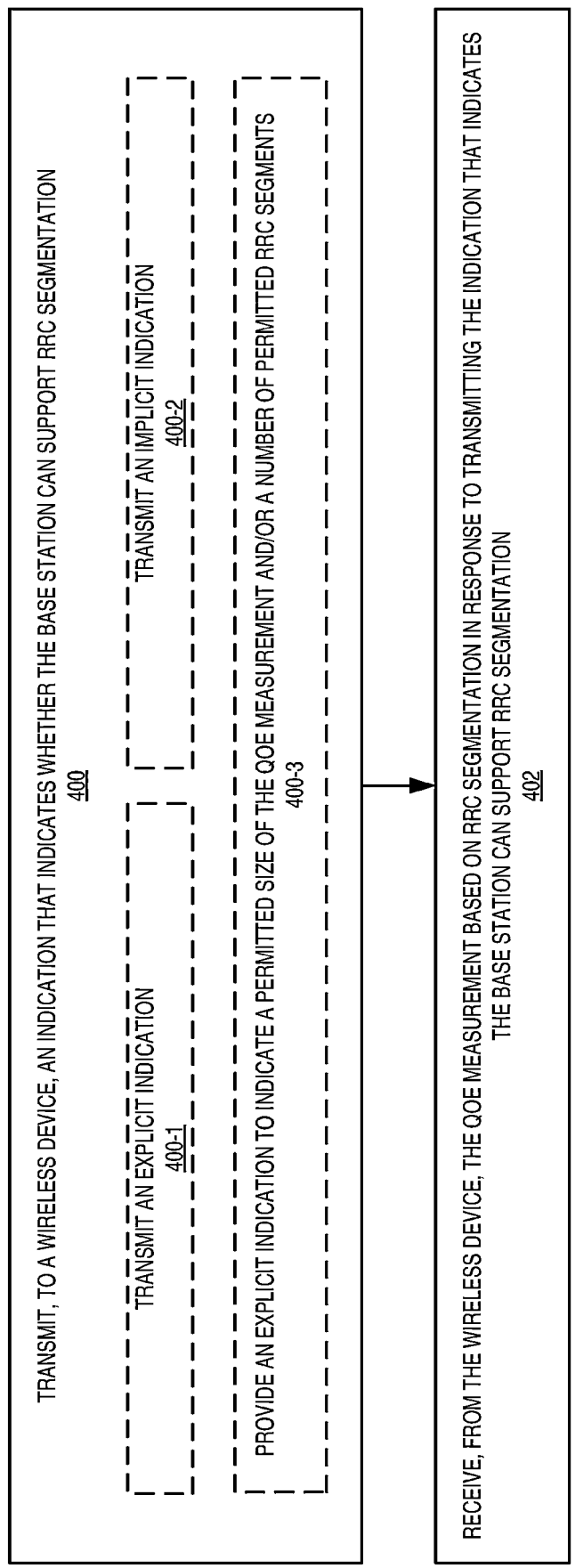
FIG. 4 is a flowchart of an exemplary method performed by a base station for communicating the QoE measurement.

Before discussing specific embodiments of the present disclosure, an overview of methods that are performed by a wireless device and a base station for communicating a QoE measurement is first presented with reference to FIGS. 3 and 4, respectively.

FIG. 3 is a flowchart of an exemplary method performed by a wireless device for communicating a QoE measurement. The wireless device is configured to receive, from at least one network node, an indication that indicates whether the at least one network node can support RRC segmentation (step 300). In a non-limiting example, RRC segmentation can be inherently included, but dynamically enabled or disabled, in the network node. In this regard, the network node is said to support RRC segmentation when RRC segmentation has been enabled in the network node.

In one embodiment, the wireless device may receive the indication explicitly (step 300-1) and, accordingly, forward the indication received outside a QoE configuration container from an access stratum layer to an application layer (step 300-1*a*). In another embodiment, the wireless device may receive the indication implicitly (step 300-2). Notably, the wireless device may also receive the indication from a first network node that indicates the first network node can support RRC segmentation (step 300-3).

Accordingly, the wireless device can transmit, to the at least one network node, a QoE measurement based on RRC segmentation in response to receiving (300) the indication that indicates the at least one network node can support RRC segmentation (step 302). The wireless device may determine a permitted size of the QoE measurement (step 302-1) and, if necessary, truncate the QoE measurement to the permitted size (step 302-2). The wireless device may employ a QoE buffer of a first size if the indication indicates that the at least one network node can support RRC segmentation (302-3*a*), employ the QoE measurement buffer of a second size smaller than the first size if the indication indicates that the at least one network node does not support RRC segmentation (step 302-3*b*), or indicate an adjustment to a size of the QoE measurement buffer from an access stratum layer to an application layer (step 302-3*c*). In response to a contradiction related to transmitting the QoE measurement based on RRC segmentation, the wireless device may discard the QoE measurement (step 302-4*a*), transmit a subset of the QoE measurement (step 302-4*b*), or store the QoE measurement (step 302-4*c*). The wireless device may also transmit the QoE measurement to a second network node based on RRC segmentation (step 302-5) in response to receiving the indication from the first network node that indicates the first network node can support RRC segmentation (step 300-3).

FIG. 4 is a flowchart of an exemplary method performed by a base station for communicating a QoE measurement. The base station is configured to transmit, to a wireless device, an indication that indicates whether the base station can support RRC segmentation (step 400). The base station may transmit an explicit indication (step 400-1) or an implicit indication (step 400-2). The base station may provide an explicit indication to indicate a permitted size of the QoE measurement and/or a number of permitted RRC segments (step 400-3). Accordingly, the base station can receive, from the wireless device, the QoE measurement based on RRC segmentation (step 402).

Notably, it may be necessary for a network node (e.g., a base station) and a wireless device (e.g., a UE) to exchange certain signaling to configure and/or carry out QoE measurement reporting based on RRC segmentation. In this regard, FIGS. 5, 6, and 7 are flowcharts illustrating exemplary methods to be employed by a wireless device and a network node for communicating QoE measurements based on RRC segmentation.

Figure 5:
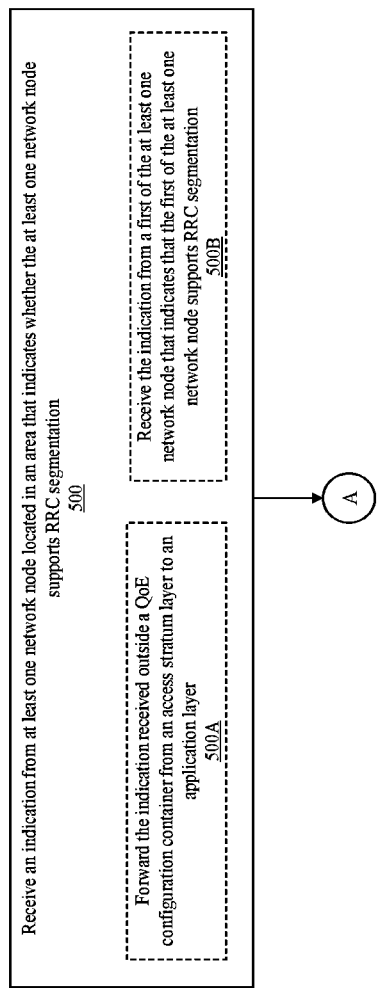
FIGS. 5 and 6 are flowcharts of an exemplary method performed by the wireless device for communicating the QoE measurement(s) based on Radio Resource Control (RRC) segmentation.
Figure 6:
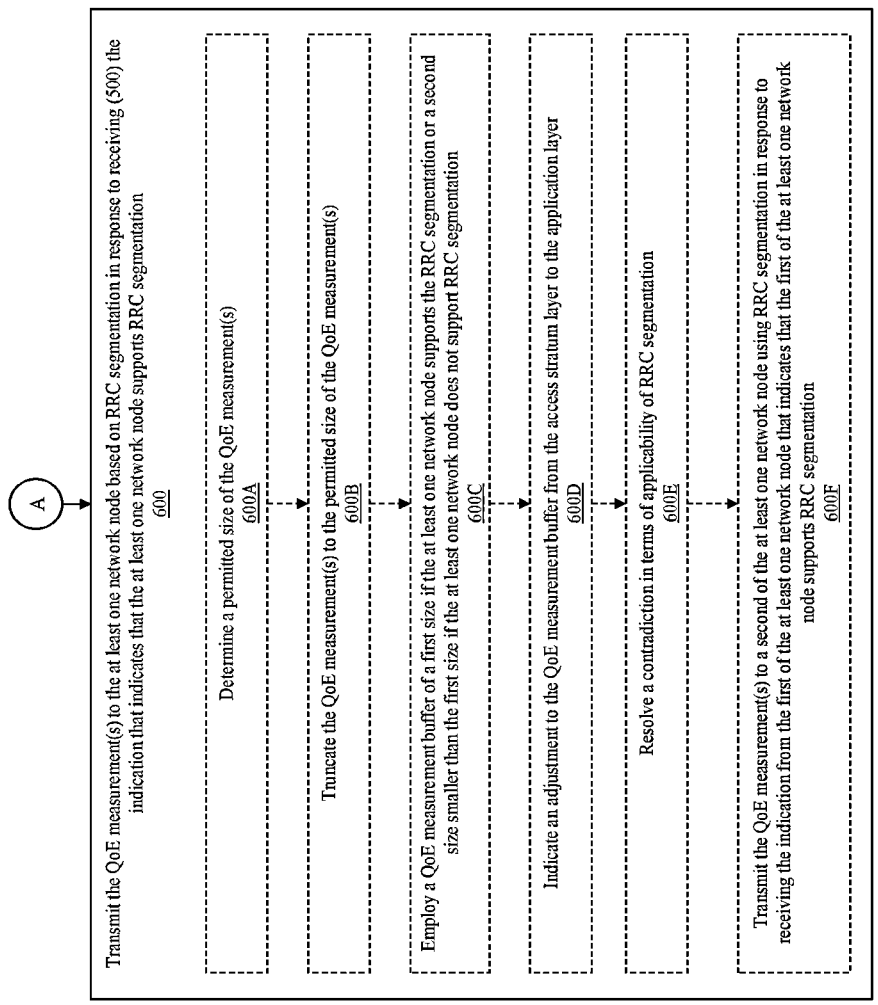
Figure 7:
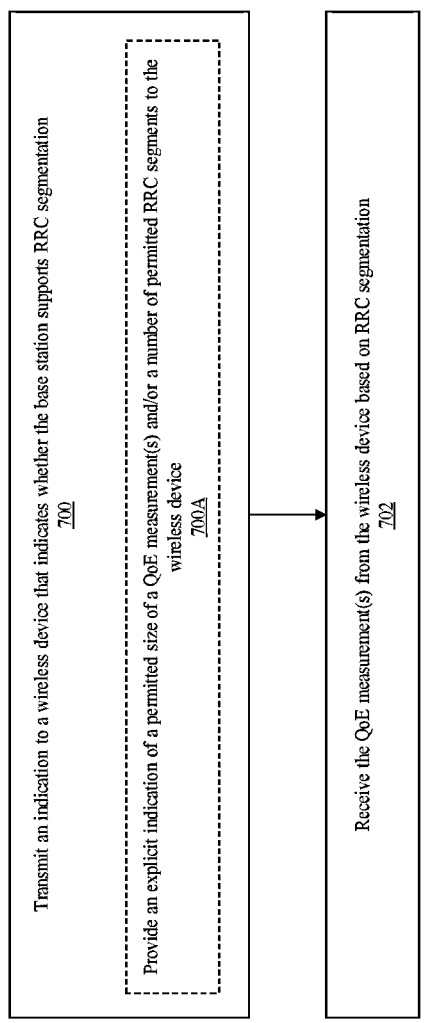
FIG. 7 is a flowchart of an exemplary method performed by the base station for communicating a QoE measurement(s) based on RRC segmentation.

In this regard, FIGS. 5 and 6 are flowcharts of an exemplary method performed by a wireless device for communicating a QoE measurement(s) based on RRC segmentation. The wireless device receives an indication (e.g., in OtherConfig IE of RRCReconfiguration) from at least one network node located in an area (e.g., a tracking area, a RAN area, a list of cells, etc.) that indicates whether the network node supports RRC segmentation (step 500). The wireless device may optionally forward the indication from an access stratum layer (e.g., RRC layer) to an application layer if the indication is received outside a QoE configuration container (e.g., rrc-MessageSegmentContainer) via an AT command(s) (step 500A). In a non-limiting example, the at least one network node can include a first network node and a second network node located in the area. In this regard, the wireless device may receive the indication from the first network node (step 500B).

In response to receiving the indication from the network node that indicates that the network node supports RRC segmentation, the wireless device can transmit a QoE measurement(s) to the network node based on RRC segmentation (step 600). Prior to transmitting (600) the QoE measurement(s), the wireless device may perform one or more of the following steps:

Determine a permitted size of the QoE measurement(s) (step 600A),

Truncate the QoE measurement(s) to the permitted size of the QoE measurement(s) (step 600B), Employ a QoE measurement buffer of a first size if the network node supports RRC segmentation or a second size smaller than the first size if the network node does not support RRC segmentation (step 600C), Indicate an adjustment to the QoE measurement buffer from the access stratum layer (e.g., RRC layer) to the application layer (step 600D), Resolve a contradiction in terms of RRC segmentation (600E)

In case the wireless device has received the indication from the first network node in step 500B, the wireless device may transmit the QoE measurement(s) to the second network node using RRC segmentation (step 600F).

FIG. 7 is a flowchart of an exemplary method performed by a base station for communicating a QoE measurement(s) based on RRC segmentation. The base station transmits an indication (e.g., in OtherConfig IE of RRCReconfiguration) to a wireless device that indicates whether the base station supports RRC segmentation (step 700). The base station may provide an explicit indication of a permitted size of the QoE measurement(s) and/or a number of permitted RRC segments to the wireless device (step 700A). In response to transmitting the indication to the wireless device that indicates that the base station supports RRC segmentation, the base station can receive a QoE measurement(s) from the wireless device based on RRC segmentation (step 702).

Specific embodiments related to receiving (500) the indication from the network node, transmitting (600) the QoE measurement(s) to the network node, as illustrated in FIG. 5, transmitting (700) the indication to the wireless device, and receiving (702) the QoE measurement(s) from the wireless, as illustrated in FIG. 7, are discussed in detail below.

When it says that a network node does not support RRC segmentation, it may mean that the network has not enabled, or for other reason does not allow RRC segmentation by the UE.

Determining Whether RRC Segmentation is Supported

In one embodiment, the UE determines if the network allows the UE to send segmented QoE measurement messages to the network, for example, RRC segmentation in the UL RRC message.

The UE may determine whether the network supports RRC segmentation by receiving (e.g., steps 300, 400) an indication from a radio network node whether transmissions of (at least some) RRC messages from the UE to the network can be segmented or not. The indication may be explicitly (steps 300-1, 400-1) to indicate whether QoE measurements can be segmented. Another approach is that the indication can be a general (e.g., implicit) indication (e.g., steps 300-2, 400-2) indicating whether the network supports RRC segmentation. Accordingly, the UE can assume that if the network supports RRC segmentation and allows the UE to send QoE measurements, the network also supports receiving segmented QoE measurements.

The indication (explicit or implicit) may be provided by RAN outside the QoE configuration container and in the message used by the network to send the QoE measurement configuration to the UE (e.g., in an RRC message such as RRCReconfiguration). The indication could also be included inside the QoE configuration container received from the core network or from OAM.

If the indication is provided to the UE outside the QoE configuration container, the indication may be forwarded from the access stratum layer in the UE to the application layer, by means of AT commands (e.g., step 300-1a). The application layer then knows that large files can be sent to the access stratum layer for transmission in RRC message.

The indication may, if set to a first value, indicate that segmentation is supported and set to another value if segmentation is not supported. It may also be possible to use absence/presence logic where, if an indication is present the UE determines that segmentation is supported, while if not present the UE determines that segmentation is not supported. The absence/presence approach makes it possible for the network node, which does not support segmentation, to indicate to the UE that segmentation is not possible without providing an explicit indication. As such, a network node that does not support segmentation does not need to be upgraded to send an indication indicating that segmentation is not supported. This can therefore improve future compatibility.

The indication from the network may be valid in an area such that, if a network node A provided the indication to the UE, the UE considers the indication to apply to any network node B that also is within the area of network node A (e.g., 300-3, 302-3). The area may be a tracking area, a RAN area, a list of cells, etc. The UE may assume a default behavior for a network node outside the area, where the default behavior may be that segmentation is not allowed.

The area in which RRC segmentation is supported can be sent in a dedicated RRC message to the UE, e.g., RRCReconfiguration, or it may be transmitted in system information. Another option is that the indication is included at handover, so that when the UE performs a handover from one cell to another, the UE receives an indication whether the new cell supports RRC segmentation or not.

The embodiment discussed herein is for the case of using RRC segmentation for transmission of QoE measurement report file to the network node in Uplink (UL), but RRC segmentation may also be used for reception of the QoE measurement configuration file from the network node in Downlink (DL).

UE Capabilities for QoE and RRC Segmentation

One approach is that, if the UE both indicates that the UE supports RRC segmentation and QoE measurements, the network may conclude that the UE supports RRC segmentation for QoE measurements. The network may in such case configure the UE to send the QoE measurement report files using RRC segmentation and/or it may send the QoE configuration file using RRC segmentation. Another option is that there is a separate UE capability for indicating support of QoE measurements and for RRC segmentation. There could be different alternatives like support for QoE+RRC segmentation, support for QoE+UL RRC segmentation, support for QoE+DL RRC segmentation etc.

Considering the RAT-Type

The UE may determine the size of the QoE measurements that the UE can send to the network (e.g., step 302-1). When doing so, the UE may consider which RAT-type is used when determining how large the measurements can be.

If a first RAT is used, the UE determine that the size limit for a particular transmission has a first size limitation. If a second RAT is used, the UE determines that the size limitation has a second size limitation.

It may happen that the UE first gets provided with the configuration for performing measurements when using a first RAT but should send the measurements when using a second RAT. In one version of the embodiment, when determining which "RAT is used" the UE may consider the RAT used when the UE needs to send the measurements.

When it here says that a RAT is "used," it can mean for example that a certain version of a protocol entity is used, for example if the Packet Data Convergence Protocol (PDCP) entity is of a version associated with that RAT. In one particular example, it may be so that the UE is connected to the network using LTE, but NR PDCP is used for that connection, and in this case the UE may consider NR to be used since NR PDCP is used even if the LTE versions of the specifications are used for other parts of the connection (e.g., other parts than the PDCP entity).

QoE Measurement Buffer Size Adjustment

In one embodiment, the UE may adjust a QoE measurement buffer used by the UE for maintaining the QoE measurements. If the UE determines that segmentation is supported, the UE may apply a large buffer (e.g., step 302-3a). In contrast, if the UE determines that segmentation is not supported, the UE may apply a smaller buffer size (e.g., step 302-3b).

The RRC entity in the UE may be the entity that determines the size of the QoE measurement buffer (e.g., 302-1). The result of this determining-step may be indicated to the QoE measurement collection entity in the UE which based on this takes some action, e.g., adjusts the buffer used for measurements.

If the UE has first determined that the buffer size should be of a first size, but later determines, based on methods described herein, that the buffer size should be of a second size, which is larger than the first size, i.e., the buffer size should become larger, the UE may extend the buffer and hence will fit more measurements in the buffer.

In contrast, if the UE determines that the buffer should become smaller, the UE may shrink the buffer. In this case, the UE may discard (truncate) part of the measurements such that they fit in the buffer (e.g., 302-2). The UE may discard oldest measurements first (e.g., 302-4a).

By adjusting the buffer for the measurements as described herein, it is ensured that the UE does not send measurements which are larger than what is allowed by the network node.

Another approach (which may or may not be combined with the buffer size adjustments described in this section), as described in other parts of this document, is that the UE assumes a large buffer size until it is time to transmit the QoE measurements to the network and then the UE only transmits part of the QoE measurements (e.g., truncating and discarding the rest of the QoE measurements) (e.g., step 302.4b) such that the transmitted part can fit in the transmission.

Network can Directly Indicate the Size the UE Shall Apply

Above it has been described how the network indicates whether RRC segmentation is supported or not and that the UE uses this information to determine the size of the QoE measurements. However, in one embodiment, the network may explicitly indicate a size of the QoE measurements that the UE should use for sending the QoE measurements (e.g., step 400-3). The size of the QoE measurements can be indicated in terms of bytes/bits etc.

The Network Indicates the Number of Segments the UE can Assume can be Sent

In one embodiment the network indicates a number of permitted RRC segments the UE can send (e.g., step 400-3). The UE may consider the number of permitted RRC segments when determining the size of the QoE measurements. The number of permitted RRC segments may be indicated as an integer-value.

Contradiction

A UE may have previously determined that it may be possible to send the report using a segmented message. However, when the UE should send the report, the UE may determine that the network node currently serving the UE does not support RRC segmentation. In this case a contradiction is said to have occurred. As a result, the UE may be forced to send the QoE measurement(s) in a single RRC segment.

However, the UE may have already stored the QoE measurements of a size larger than what can be sent in a single RRC segment. In this regard, in one embodiment, the UE may take one or more of the following actions:

UE discards the QoE measurements (e.g., step 302-4a)

UE sends a limited set of the QoE measurements (e.g., step 302-4b). Sending a limited set of the measurements may comprise:

only send a set of measurements which was latest acquired only send a set of measurements of a certain type, or types UE stores the QoE measurements and possibly sends the QoE measurements later (e.g., step 302-4c), if RRC segmentation is allowed in a different node which the UE may handover to later.

Sending the Measurements

In one embodiment, the UE adjusts the buffer used by the UE for maintaining the QoE measurements. If the UE determines that segmentation is supported, the UE may apply a large buffer (e.g., step 302-3a). In contrast, if the UE determines that segmentation is not supported, the UE may apply a smaller buffer size (e.g., step 302-3b).

The RRC entity in the UE may be the entity that determines the size to be applied for the QoE measurements. The result of this determining may be indicated to the QoE measurement collection entity in the UE (e.g., step 302-3c), which takes some action (e.g., adjusts the buffer used for measurements) based on determination.

By adjusting the buffer for the measurements, it is ensured that the UE does not send measurements larger than what is permitted.

The UE may indicate the adjustment of the buffer from the RRC layer to the application layer by means of AT commands. In the AT-command the new size may be indicated.

Example Implementation

The network may indicate to the UE that it may send the QoE measurements segmented in the RRC message RRCReconfiguration (e.g., in the IE OtherConfig). The configuration may look as follows:

OtherConfig

The IE OtherConfig contains configuration related to miscellaneous other configurations.

| OtherConfig information element |
|---|

```
-- ASN1START
-- TAG-OTHERCONFIG-START
OtherConfig ::=                          SEQUENCE {
  delayBudgetReportingConfig CHOICE{
    release                              NULL,
    setup                                SEQUENCE{
      delayBudgetReportingProhibitTimer              ENUMERATED {s0, s0dot4, s0dot8,
s1dot6, s3, s6, s12, s30}
    }
  }                                                                    OPTIONAL
-- Need M
}
OtherConfig-v1540 ::=                    SEQUENCE {
  overheatingAssistanceConfig               SetupRelease {OverheatingAssistanceConfig}
OPTIONAL, -- Need M
  ...
}
OverheatingAssistanceConfig ::= SEQUENCE {
  overheatingIndicationProhibitTimer             ENUMERATED {s0, s0dot5, s1, s2, s5, s10, s20,
s30,
                                         s60, s90, s120, s300, s600, spare3, spare2, spare1}
}
OtherConfig-v17xy ::=                    SEQUENCE {
  measConfigAppLayer-r17                     SetupRelease {MeasConfigAppLayer-r17}
OPTIONAL, -- Need M
  ...
}
MeasConfigAppLayer-r15                   SEQUENCE{
        measConfigAppLayerContainer-r15         OCTET STRING (SIZE(1..1000)),
        serviceType-r15                          ENUMERATED {qoe, qoemtsi, spare6,
spare5, spare4, spare3, spare2, spare1}
        },
        rrcSegmentationAllowed           BOOLEAN
  }              OPTIONAL,        -- Need ON
-- TAG-OTHERCONFIG-STOP
-- ASN1STOP
```

ULDedicatedMessageSegment
The ULDedicatedMessageSegment message is used to transfer segments of the UECapabilityInformation or MeasReportAppLayer message.
  Signalling radio bearer: SRB1, SRB4
  RLC-SAP: AM
  Logical channel: DCCH
  Direction: UE to Network

| ULDedicatedMessageSegment message |
|---|

```
-- ASN1START
-- TAG-ULDEDICATEDMESSAGESEGMENT-START
ULDedicatedMessageSegment-r16 ::=          SEQUENCE {
  criticalExtensions                    CHOICE {
    ulDedicatedMessageSegment-r16           ULDedicatedMessageSegment-r16-IEs,
    criticalExtensionsFuture             SEQUENCE { }
  }
}
ULDedicatedMessageSegment-r16-IEs ::=       SEQUENCE {
  segmentNumber-r16                     INTEGER (0..15),
  rrc-MessageSegmentContainer-r16        OCTET STRING,
  segmentEndIndication-r16               ENUMERATED {true}     OPTIONAL,
  lateNonCriticalExtension               OCTET STRING          OPTIONAL,
  nonCriticalExtension                   SEQUENCE { }          OPTIONAL
}
-- TAG-ULDEDICATEDMESSAGESEGMENT-STOP
-- ASN1STOP
```

| ULDedicatedMessageSegmentfield descriptions |
| --- |
| segmentNumber |
| Identifies the sequence number of a segment within the encoded UL DCCH message. |
| rrc-MessageSegmentContainer |
| Includes a segment of the encoded UL DCCH message. The size of the included segment in this container should be small enough that the resulting encoded RRC message PDU is less than or equal to the PDCP SDU size limit. |
| segmentEndIndication |
| Indicates whether the included UL DCCH message segment is the last segment or not. |

The implementation in 3GPP TS 27.007 may look as follows:
8.78 Application Level Measurement Configuration +CAPPLEVMC

TABLE 8.78-1

+CAPPLEVMC parameter command syntax

| Command | Possible response(s) |
| --- | --- |
| +CAPPLEVMC=[<n>] | +CME ERROR: <err> |
| +CAPPLEVMC? | +CAPPLEVMC: <n> |
| +CAPPLEVMC=? | +CAPPLEVMC: (list of supported <n>s) |

Description
  This command allows control of the application level measurement configuration according to 3GPP TS 25.331 [74] and 3GPP TS 36.331 [86]. The set command controls the presentation of the unsolicited result code +CAPPLEVMC: <app-meas_service_type>, <start-stop_reporting>[,<app-meas_config_file_length>,<app-meas_config-file>] providing data for the configuration. Refer subclause 9.2 for possible <err> values.
  Read command returns the current value of <n>.
  Test command returns values supported as a compound value.
Defined Values
  <n>: integer type. Disable and enable presentation of the unsolicited result code +CAPPLEVMC to the TE.
  0 Disable presentation of the unsolicited result code
  1 Enable presentation of the unsolicited result code
  <app-meas_service_type>: integer type. Contains the indication of what application that is a target for the application level measurement configuration.
  1 QoE measurement collection for streaming services
  2 QoE measurement collection for MTSI services
  <start-stop_reporting>: integer type. Indicates the start and stop of the application level measurement reporting for the application indicated by the <app-meas_service_type>.
  0 start the application level measurement reporting
  1 stop the application level measurement reporting
  <app-meas_config_file_length>: integer type. Indicates the number of octets of the <app-meas_config-file> parameter.
  <app-meas_config-file>: string of octets. Contains the application level measurement configuration file for the application indicated by the <app-meas_service_type>. The parameter shall not be subject to conventional character conversion as per +CSCS.
  <app-meas_segmentation>: integer type. Contains an indication of whether segmentation of application level measurement reporting is allowed.
  0 segmentation of application level measurement reporting is allowed
  1 segmentation of application level measurement reporting is allowed
Implementation
  Optional.

Additional Description

Part of this disclosure can be implemented in the RRC layer. The RRC layer may be implemented in a cloud environment. Hence part of this disclosure can be implemented in a cloud environment.

Figure 8:
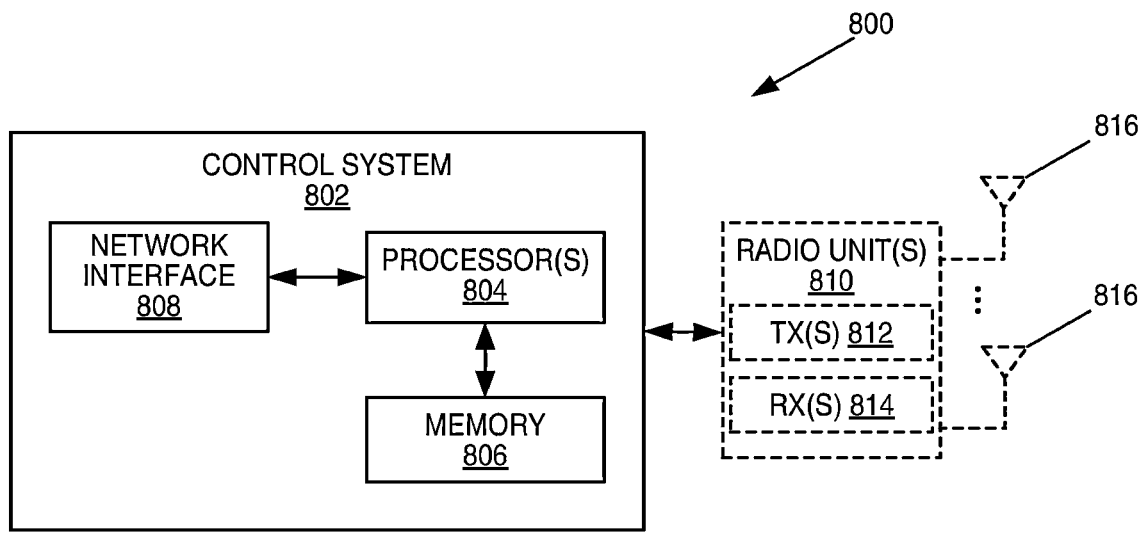
FIG. 8 is a schematic block diagram of a radio access node according to some embodiments of the present disclosure.

FIG. 8 is a schematic block diagram of a radio access node 800 according to some embodiments of the present disclosure. Optional features are represented by dashed boxes. The radio access node 800 may be, for example, a base station 202 or 206 or a network node that implements all or part of the functionality of the base station 202 or gNB described herein. As illustrated, the radio access node 800 includes a control system 802 that includes one or more processors 804 (e.g., Central Processing Units (CPUs), Application Specific Integrated Circuits (ASICs), Field Programmable Gate Arrays (FPGAs), and/or the like), memory 806, and a network interface 808. The one or more processors 804 are also referred to herein as processing circuitry. In addition, the radio access node 800 may include one or more radio units 810 that each includes one or more transmitters 812 and one or more receivers 814 coupled to one or more antennas 816. The radio units 810 may be referred to or be part of radio interface circuitry. In some embodiments, the radio unit(s) 810 is external to the control system 802 and connected to the control system 802 via, e.g., a wired connection (e.g., an optical cable). However, in some other embodiments, the radio unit(s) 810 and potentially the antenna(s) 816 are integrated together with the control system 802. The one or more processors 804 operate to provide one or more functions of a radio access node 800 as described herein. In some embodiments, the function(s) are implemented in software that is stored, e.g., in the memory 806 and executed by the one or more processors 804.

Figure 9:
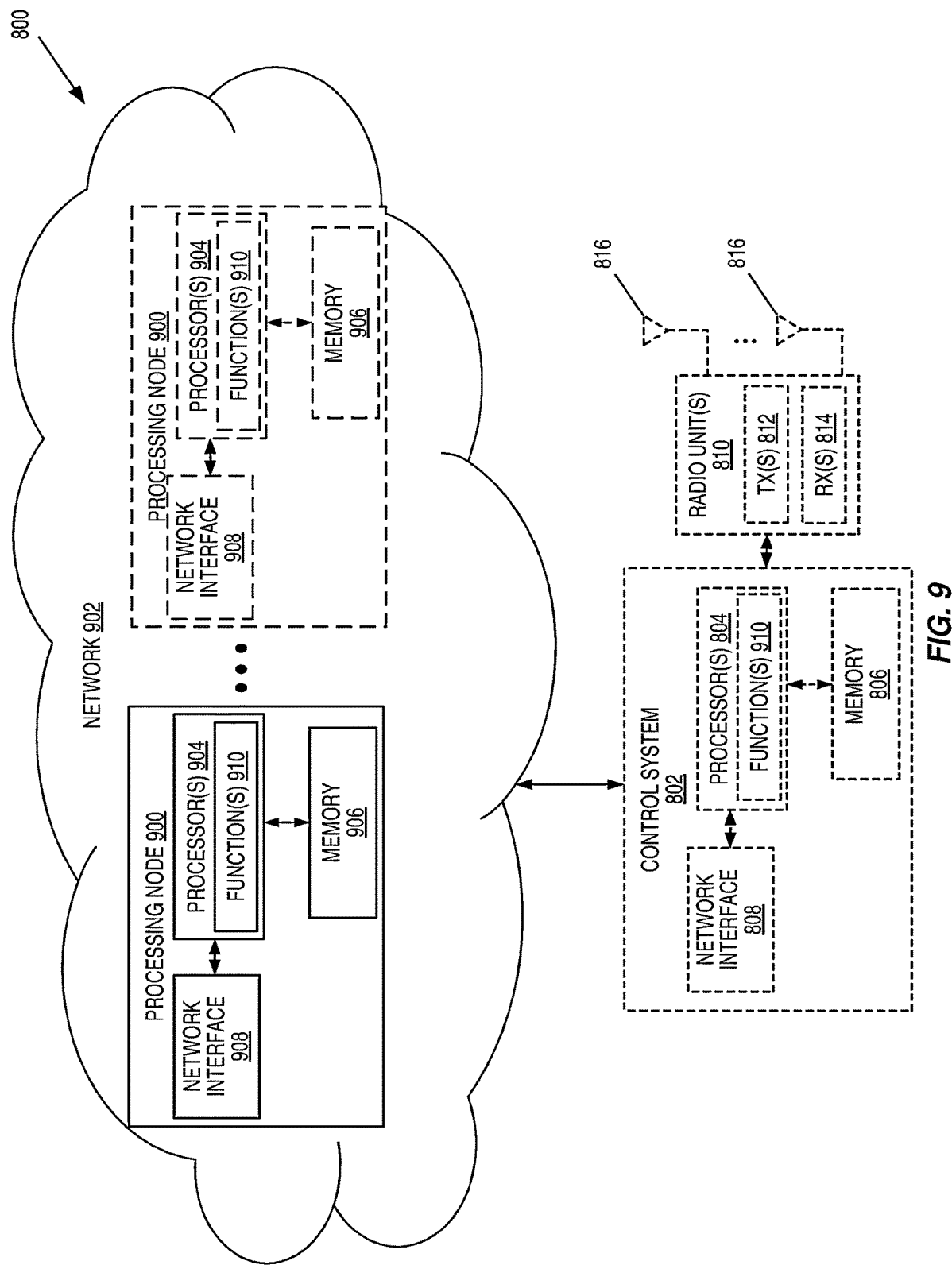
FIG. 9 is a schematic block diagram that illustrates a virtualized embodiment of the radio access node according to some embodiments of the present disclosure.

FIG. 9 is a schematic block diagram that illustrates a virtualized embodiment of the radio access node 800 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 800 in which at least a portion of the functionality of the radio access node 800 is implemented as a virtual component(s) (e.g., via a virtual machine(s) executing on a physical processing node(s) in a network(s)). As illustrated, in this example, the radio access node 800 may include the control system 802 and/or the one or more radio units 810, as described above. The control system 802 may be connected to the radio unit(s) 810 via, for example, an optical cable or the like. The radio access node 800 includes one or more processing nodes 900 coupled to or included as part of a network(s) 902. If present, the control system 802 or the radio unit(s) is connected to the processing node(s) 900 via the network 902. Each processing node 900 includes one or more processors 904 (e.g., CPUs, ASICs, FPGAs, and/or the like), memory 906, and a network interface 908.

In this example, functions 910 of the radio access node 800 described herein are implemented at the one or more processing nodes 900 or distributed across the one or more processing nodes 900 and the control system 802 and/or the radio unit(s) 810 in any desired manner. In some particular embodiments, some or all of the functions 910 of the radio access node 800 described herein are implemented as virtual components executed by one or more virtual machines implemented in a virtual environment(s) hosted by the processing node(s) 900. As will be appreciated by one of ordinary skill in the art, additional signaling or communication between the processing node(s) 900 and the control system 802 is used in order to carry out at least some of the desired functions 910. Notably, in some embodiments, the control system 802 may not be included, in which case the radio unit(s) 810 communicates directly with the processing node(s) 900 via an appropriate network interface(s).

In some embodiments, a computer program including instructions which, when executed by at least one processor, causes the at least one processor to carry out the functionality of the radio access node 800 or a node (e.g., a processing node 900) implementing one or more of the functions 910 of the radio access node 800 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
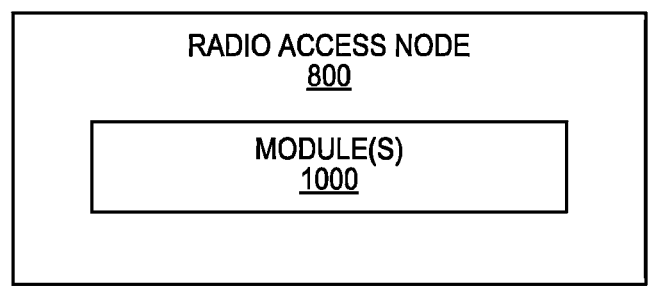
FIG. 10 is a schematic block diagram of the radio access node according to some other embodiments of the present disclosure.

FIG. 10 is a schematic block diagram of the radio access node 800 according to some other embodiments of the present disclosure. The radio access node 800 includes one or more modules 1000, each of which is implemented in software. The module(s) 1000 provides the functionality of the radio access node 800 described herein. This discussion is equally applicable to the processing node 900 of FIG. 9 where the modules 1000 may be implemented at one of the processing nodes 900 or distributed across multiple processing nodes 900 and/or distributed across the processing node(s) 900 and the control system 802.

Figure 11:
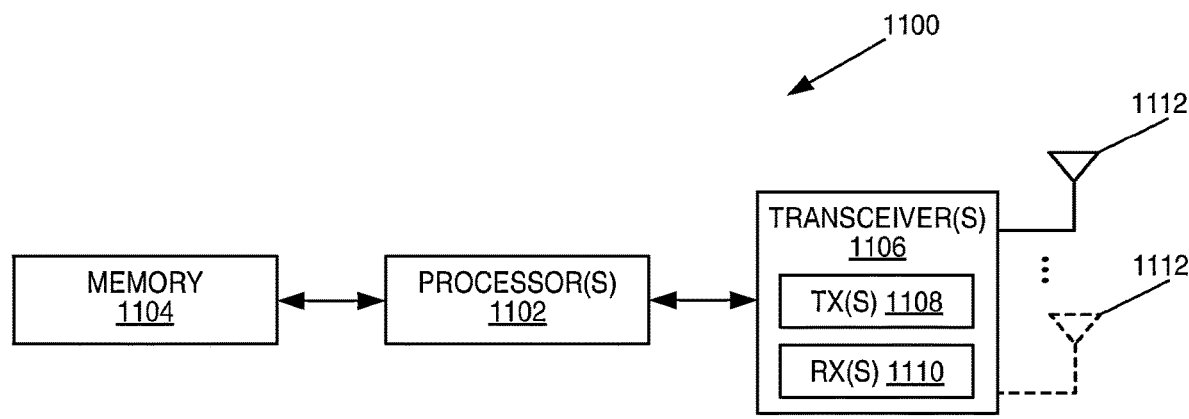
FIG. 11 is a schematic block diagram of a wireless communication device according to some embodiments of the present disclosure.

FIG. 11 is a schematic block diagram of a wireless communication device 1100 according to some embodiments of the present disclosure. As illustrated, the wireless communication device 1100 includes one or more processors 1102 (e.g., CPUs, ASICs, FPGAs, and/or the like), memory 1104, and one or more transceivers 1106 each including one or more transmitters 1108 and one or more receivers 1110 coupled to one or more antennas 1112. The transceiver(s) 1106 includes radio-front end circuitry connected to the antenna(s) 1112 that is configured to condition signals communicated between the antenna(s) 1112 and the processor(s) 1102, as will be appreciated by one of ordinary skill in the art. The processors 1102 are also referred to herein as processing circuitry. The transceivers 1106 are also referred to herein as radio circuitry. In some embodiments, the functionality of the wireless communication device 1100 described above may be fully or partially implemented in software that is, e.g., stored in the memory 1104 and executed by the processor(s) 1102. Note that the wireless communication device 1100 may include additional components not illustrated in FIG. 11 such as, e.g., one or more user interface components (e.g., an input/output interface including a display, buttons, a touch screen, a microphone, a speaker(s), and/or the like and/or any other components for allowing input of information into the wireless communication device 1100 and/or allowing output of information from the wireless communication device 1100), a power supply (e.g., a battery and associated power circuitry), etc.

In some embodiments, a computer program including instructions which, when executed by at least one processor, causes the at least one processor to carry out the functionality of the wireless communication device 1100 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
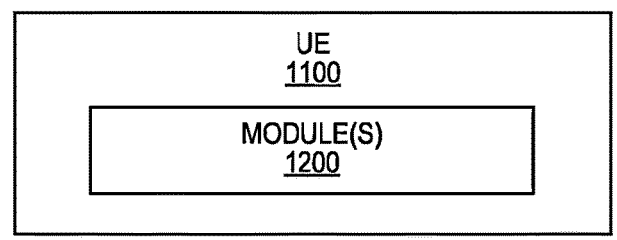
FIG. 12 is a schematic block diagram of the wireless communication device according to some other embodiments of the present disclosure.

FIG. 12 is a schematic block diagram of the wireless communication device 1100 according to some other embodiments of the present disclosure. The wireless communication device 1100 includes one or more modules 1200, each of which is implemented in software. The module(s) 1200 provides the functionality of the wireless communication device 1100 described herein.

Figure 13:
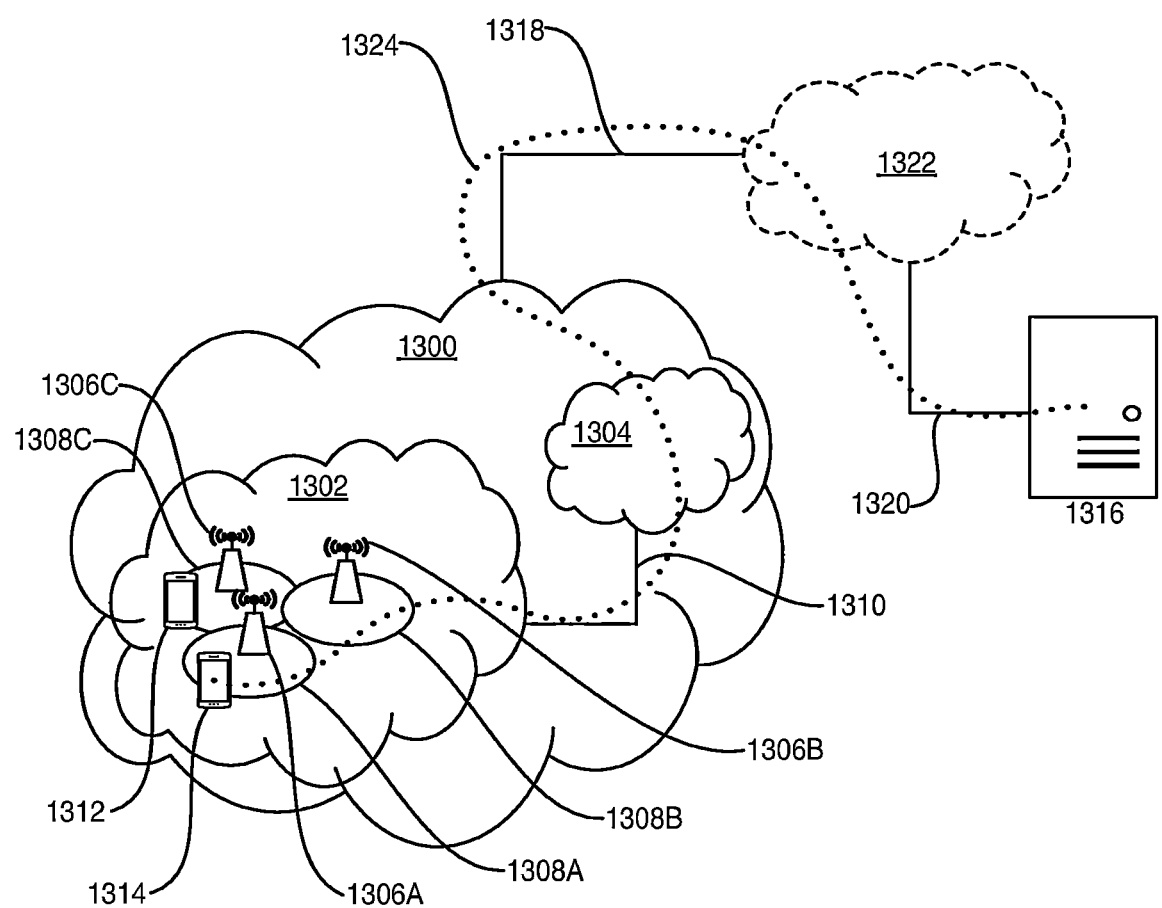
FIG. 13 is a schematic block diagram of a communication system in accordance with one embodiment of the present disclosure.

With reference to FIG. 13, in accordance with an embodiment, a communication system includes a telecommunication network 1300, such as a 3GPP-type cellular network, which comprises an access network 1302, such as a RAN, and a core network 1304. The access network 1302 comprises a plurality of base stations 1306A, 1306B, 1306C, such as Node Bs, eNBs, gNBs, or other types of wireless Access Points (APs), each defining a corresponding coverage area 1308A, 1308B, 1308C. Each base station 1306A, 1306B, 1306C is connectable to the core network 1304 over a wired or wireless connection 1310. A first UE 1312 located in coverage area 1308C is configured to wirelessly connect to, or be paged by, the corresponding base station 1306C. A second UE 1314 in coverage area 1308A is wirelessly connectable to the corresponding base station 1306A. While a plurality of UEs 1312, 1314 are illustrated in this example, the disclosed embodiments are equally applicable to a situation where a sole UE is in the coverage area or where a sole UE is connecting to the corresponding base station 1306.

The telecommunication network 1300 is itself connected to a host computer 1316, which may be embodied in the hardware and/or software of a standalone server, a cloud-implemented server, a distributed server, or as processing resources in a server farm. The host computer 1316 may be under the ownership or control of a service provider, or may be operated by the service provider or on behalf of the service provider. Connections 1318 and 1320 between the telecommunication network 1300 and the host computer 1316 may extend directly from the core network 1304 to the host computer 1316 or may go via an optional intermediate network 1322. The intermediate network 1322 may be one of, or a combination of more than one of, a public, private, or hosted network; the intermediate network 1322, if any, may be a backbone network or the Internet; in particular, the intermediate network 1322 may comprise two or more sub-networks (not shown).

The communication system of FIG. 13 as a whole enables connectivity between the connected UEs 1312, 1314 and the host computer 1316. The connectivity may be described as an Over-the-Top (OTT) connection 1324. The host computer 1316 and the connected UEs 1312, 1314 are configured to communicate data and/or signaling via the OTT connection 1324, using the access network 1302, the core network 1304, any intermediate network 1322, and possible further infrastructure (not shown) as intermediaries. The OTT connection 1324 may be transparent in the sense that the participating communication devices through which the OTT connection 1324 passes are unaware of routing of uplink and downlink communications. For example, the base station 1306 may not or need not be informed about the past routing of an incoming downlink communication with data originating from the host computer 1316 to be forwarded (e.g., handed over) to a connected UE 1312. Similarly, the base station 1306 need not be aware of the future routing of an outgoing uplink communication originating from the UE 1312 towards the host computer 1316.

Example implementations, in accordance with an embodiment, of the UE, base station, and host computer discussed in the preceding paragraphs will now be described with reference to FIG. 14. In a communication system 1400, a host computer 1402 comprises hardware 1404 including a communication interface 1406 configured to set up and maintain a wired or wireless connection with an interface of a different communication device of the communication system 1400. The host computer 1402 further comprises processing circuitry 1408, which may have storage and/or processing capabilities. In particular, the processing circuitry 1408 may comprise one or more programmable processors, ASICs, FPGAs, or combinations of these (not shown) adapted to execute instructions. The host computer 1402 further comprises software 1410, which is stored in or accessible by the host computer 1402 and executable by the processing circuitry 1408. The software 1410 includes a host application 1412. The host application 1412 may be operable to provide a service to a remote user, such as a UE 1414 connecting via an OTT connection 1416 terminating at the UE 1414 and the host computer 1402. In providing the service to the remote user, the host application 1412 may provide user data which is transmitted using the OTT connection 1416.

The communication system 1400 further includes a base station 1418 provided in a telecommunication system and comprising hardware 1420 enabling it to communicate with the host computer 1402 and with the UE 1414. The hardware 1420 may include a communication interface 1422 for setting up and maintaining a wired or wireless connection with an interface of a different communication device of the communication system 1400, as well as a radio interface 1424 for setting up and maintaining at least a wireless connection 1426 with the UE 1414 located in a coverage area (not shown in FIG. 14) served by the base station 1418. The communication interface 1422 may be configured to facilitate a connection 1428 to the host computer 1402. The connection 1428 may be direct or it may pass through a core network (not shown in FIG. 14) of the telecommunication system and/or through one or more intermediate networks outside the telecommunication system. In the embodiment shown, the hardware 1420 of the base station 1418 further includes processing circuitry 1430, which may comprise one or more programmable processors, ASICs, FPGAs, or combinations of these (not shown) adapted to execute instructions. The base station 1418 further has software 1432 stored internally or accessible via an external connection.

The communication system 1400 further includes the UE 1414 already referred to. The UE's 1414 hardware 1434 may include a radio interface 1436 configured to set up and maintain a wireless connection 1426 with a base station serving a coverage area in which the UE 1414 is currently located. The hardware 1434 of the UE 1414 further includes processing circuitry 1438, which may comprise one or more programmable processors, ASICs, FPGAs, or combinations of these (not shown) adapted to execute instructions. The UE 1414 further comprises software 1440, which is stored in or accessible by the UE 1414 and executable by the processing circuitry 1438. The software 1440 includes a client application 1442. The client application 1442 may be operable to provide a service to a human or non-human user via the UE 1414, with the support of the host computer 1402. In the host computer 1402, the executing host application 1412 may communicate with the executing client application 1442 via the OTT connection 1416 terminating at the UE 1414 and the host computer 1402. In providing the service to the user, the client application 1442 may receive request data from the host application 1412 and provide user data in response to the request data. The OTT connection 1416 may transfer both the request data and the user data. The client application 1442 may interact with the user to generate the user data that it provides.

Figure 14:
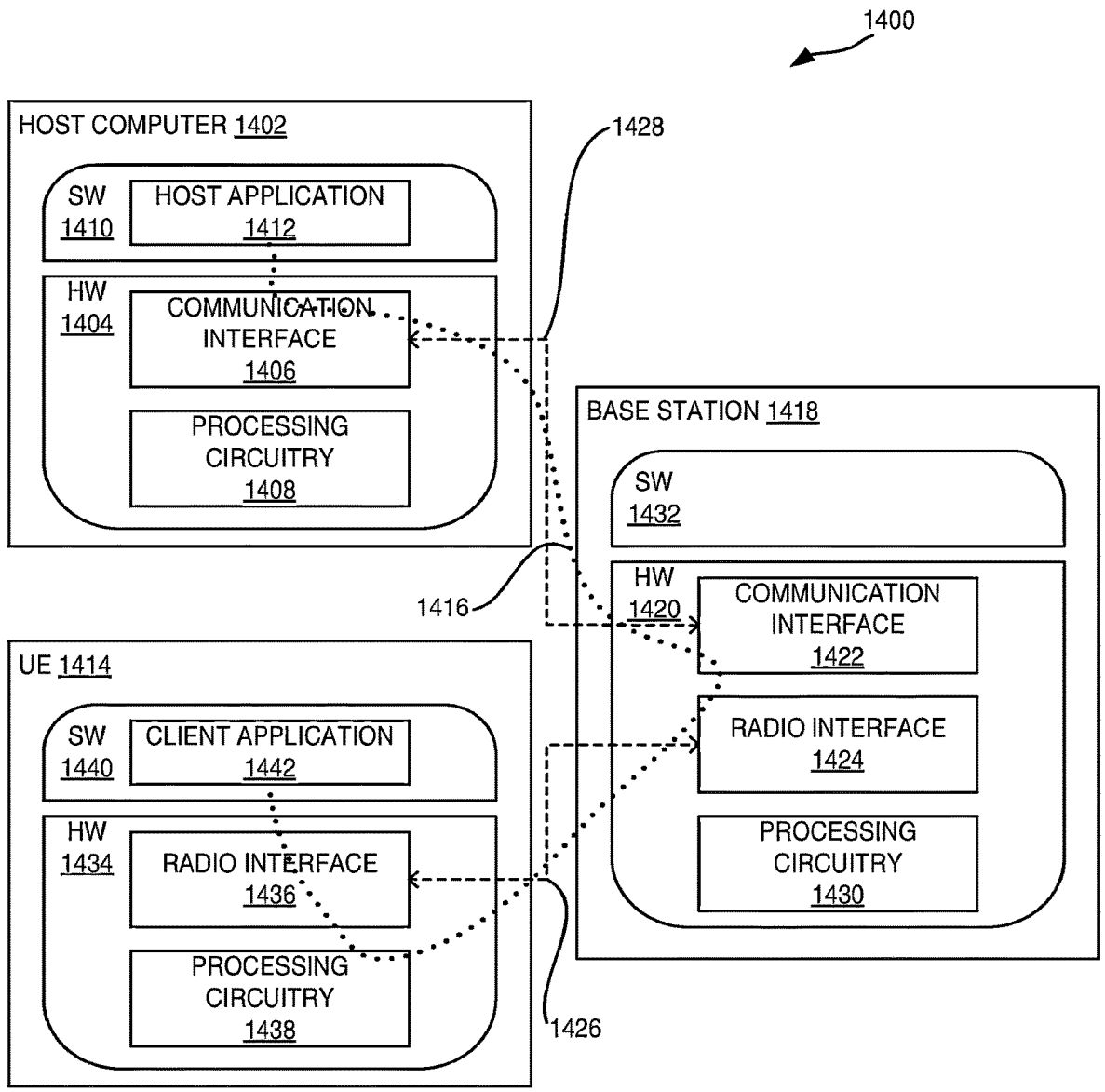
FIG. 14 is a schematic block diagram of the communication system in accordance with one embodiment of the present disclosure.

It is noted that the host computer 1402, the base station 1418, and the UE 1414 illustrated in FIG. 14 may be similar or identical to the host computer 1316, one of the base stations 1306A, 1306B, 1306C, and one of the UEs 1312, 1314 of FIG. 13, respectively. This is to say, the inner workings of these entities may be as shown in FIG. 14 and independently, the surrounding network topology may be that of FIG. 13.

In FIG. 14, the OTT connection 1416 has been drawn abstractly to illustrate the communication between the host computer 1402 and the UE 1414 via the base station 1418 without explicit reference to any intermediary devices and the precise routing of messages via these devices. The network infrastructure may determine the routing, which may be configured to hide from the UE 1414 or from the service provider operating the host computer 1402, or both. While the OTT connection 1416 is active, the network infrastructure may further take decisions by which it dynamically changes the routing (e.g., on the basis of load balancing consideration or reconfiguration of the network).

The wireless connection 1426 between the UE 1414 and the base station 1418 is in accordance with the teachings of the embodiments described throughout this disclosure. One or more of the various embodiments improve the performance of OTT services provided to the UE 1414 using the OTT connection 1416, in which the wireless connection 1426 forms the last segment. More precisely, the teachings of these embodiments may improve a network's ability to collect larger QoE measurement report files to help analyze QoE of a whole session and thereby provide benefits such as improved QoE as well as quality of service (QoE).

A measurement procedure may be provided for the purpose of monitoring data rate, latency, and other factors on which the one or more embodiments improve. There may further be an optional network functionality for reconfiguring the OTT connection 1416 between the host computer 1402 and the UE 1414, in response to variations in the measurement results. The measurement procedure and/or the network functionality for reconfiguring the OTT connection 1416 may be implemented in the software 1410 and the hardware 1404 of the host computer 1402 or in the software 1440 and the hardware 1434 of the UE 1414, or both. In some embodiments, sensors (not shown) may be deployed in or in association with communication devices through which the OTT connection 1416 passes; the sensors may participate in the measurement procedure by supplying values of the monitored quantities exemplified above, or supplying values of other physical quantities from which the software 1410, 1440 may compute or estimate the monitored quantities. The reconfiguring of the OTT connection 1416 may include message format, retransmission settings, preferred routing, etc.; the reconfiguring need not affect the base station 1418, and it may be unknown or imperceptible to the base station 1418. Such procedures and functionalities may be known and practiced in the art. In certain embodiments, measurements may involve proprietary UE signaling facilitating the host computer 1402's measurements of throughput, propagation times, latency, and the like. The measurements may be implemented in that the software 1410 and 1440 causes messages to be transmitted, in particular empty or 'dummy' messages, using the OTT connection 1416 while it monitors propagation times, errors, etc.

FIG. 15 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 15 will be included in this section. In step 1500, the host computer provides user data. In sub-step 1502 (which may be optional) of step 1500, the host computer provides the user data by executing a host application. In step 1504, the host computer initiates a transmission carrying the user data to the UE. In step 1506 (which may be optional), the base station transmits to the UE the user data which was carried in the transmission that the host computer initiated, in accordance with the teachings of the embodiments described throughout this disclosure. In step 1508 (which may also be optional), the UE executes a client application associated with the host application executed by the host computer.

FIG. 16 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 16 will be included in this section. In step 1600 of the method, the host computer provides user data. In an optional sub-step (not shown) the host computer provides the user data by executing a host application. In step 1602, the host computer initiates a transmission carrying the user data to the UE. The transmission may pass via the base station, in accordance with the teachings of the embodiments described throughout this disclosure. In step 1604 (which may be optional), the UE receives the user data carried in the transmission.

FIG. 17 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 17 will be included in this section. In step 1700 (which may be optional), the UE receives input data provided by the host computer. Additionally or alternatively, in step 1702, the UE provides user data. In sub-step 1704 (which may be optional) of step 1700, the UE provides the user data by executing a client application. In sub-step 1706 (which may be optional) of step 1702, the UE executes a client application which provides the user data in reaction to the received input data provided by the host computer. In providing the user data, the executed client application may further consider user input received from the user. Regardless of the specific manner in which the user data was provided, the UE initiates, in sub-step 1708 (which may be optional), transmission of the user data to the host computer. In step 1710 of the method, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 18 will be included in this section. In step 1800 (which may be optional), in accordance with the teachings of the embodiments described throughout this disclosure, the base station receives user data from the UE. In step 1802 (which may be optional), the base station initiates transmission of the received user data to the host computer. In step 1804 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some exemplary embodiments of the present disclosure are as follows.

Embodiment 1: A method performed by a wireless device for communicating a Quality of Experience (QoE) measurement(s) based on Radio Resource Control (RRC) segmentation. The method includes receiving (500) an indication (e.g., in OtherConfig IE of RRCReconfiguration) from at least one network node located in an area (e.g., a tracking area, a RAN area, a list of cells, etc.) that indicates whether the at least one network node supports RRC segmentation. The method also includes transmitting (600) a QoE measurement(s) to the at least one network node based on RRC segmentation in response to receiving (500) the indication that indicates that the at least one network node supports RRC segmentation.

Embodiment 2: The indication received from the at least one network node is an explicit indication or an implicit indication that indicates that the at least one network node supports the wireless device to send the QoE measurement(s) using RRC segmentation.

Embodiment 3: The explicit indication comprises one or more of the following: an indication received outside a QoE configuration container (e.g., rrc-MessageSegmentContainer) and in a message used by the at least one network node to send a QoE measurement configuration to the wireless device (e.g., RRCReconfiguration); and an indication received inside a QoE configuration container (e.g., rrc-MessageSegmentContainer). The implicit indication comprises one or more of the following: a QoE measurement configuration file received from the at least one network node based on RRC segmentation; and an indication provided from the wireless device to the at least one network node that indicates that the wireless device supports RRC segmentation and QoE measurement.

Embodiment 4: The method also includes forwarding (500A) the indication received outside the QoE configuration container from an access stratum layer (e.g., RRC layer) in the wireless device to an application layer in the wireless device (e.g., via an AT command(s)).

Embodiment 5: Transmitting (600) the QoE measurement(s) comprises determining (600A) a permitted size of the QoE measurement(s) based on one or more of the following: a Radio Access Technology (RAT) supported by the at least one network node; and an explicit indication received from the at least one network node that indicates the permitted size of the QoE measurement(s) and/or a number of permitted RRC segments from the at least one network node.

Embodiment 6: Transmitting (600) the QoE measurement(s) further comprises truncating (600B) the QoE measurement(s) to the permitted size of the QoE measurement(s).

Embodiment 7: Transmitting (600) the QoE measurement(s) further comprises employing (600C) a QoE measurement buffer of a first size if the at least one network node supports RRC segmentation or a second size smaller than the first size if the at least one network node does not support RRC segmentation.

Embodiment 8: Transmitting (600) the QoE measurement(s) further comprises indicating (600D) an adjustment to the QoE measurement buffer from the access stratum layer (e.g., RRC layer) in the wireless device to the application layer in the wireless device (e.g., via the AT command(s)).

Embodiment 9: Transmitting (600) the QoE measurement(s) further comprises resolving (600F) a contradiction in terms of applicability of RRC segmentation by taking one or more of the following actions in response determining the contradiction: discarding the QoE measurement(s); sending a subset of the QoE measurement(s); and storing the QoE measurement(s).

Embodiment 10: The subset of the QoE measurement(s) comprises one of the following: a latest acquired QoE measurement(s) as the subset of the QoE measurements; and a specific type(s) of the QoE measurement(s) as the subset of the QoE measurement(s).

Embodiment 11: The at least one network node comprises a first network node and a second network node located in the area, wherein: receiving (500) the indication from the at least one network node further comprises receiving (500B) the indication from the first network node that indicates that the first network node supports RRC segmentation; and transmitting (600) the QoE measurement(s) to the at least one network node further comprises transmitting (600F) the QoS measurement(s) to the second network node using RRC segmentation.

Embodiment 12: The method also includes providing user data; and forwarding the user data to a host computer via the transmission to the base station.

Embodiment 13: A method performed by a base station for communicating a Quality of Experience (QoE) measurement(s) based on Radio Resource Control (RRC) segmentation. The method includes transmitting (700) an indication (e.g., in OtherConfig IE of RRCReconfiguration) to a wireless device that indicates that the base station supports RRC segmentation. The method also includes receiving (600) a QoE measurement(s) from the wireless device based on RRC segmentation.

Embodiment 14: The indication transmitted to the wireless device is an explicit indication or an implicit indication that indicates that the at least one network node supports the wireless device to send the QoE measurement(s) using RRC segmentation.

Embodiment 15: The explicit indication comprises one or more of the following: an indication received outside a QoE configuration container (e.g., rrc-MessageSegmentContainer) and in a message used by the at least one network node to send a QoE measurement configuration to the wireless device (e.g., RRCReconfiguration); and an indication received inside a QoE configuration container (e.g., rrc-MessageSegmentContainer). The implicit indication comprises one or more of the following: a QoE measurement configuration file transmitted to the wireless device based on RRC segmentation; and an indication received from the wireless device that indicates that the wireless device supports RRC segmentation and QoE measurement.

Embodiment 16: Transmitting (700) the indication to the wireless device further comprising providing (700A) an explicit indication of a permitted size of the QoE measurement(s) and/or a number of permitted RRC segments to the wireless device.

Embodiment 17: The method also includes obtaining user data; and forwarding the user data to a host computer or a wireless device.

Embodiment 18: A wireless device for communicating a Quality of Experience (QoE) measurement(s) based on Radio Resource Control (RRC) segmentation is provided. The wireless device includes processing circuitry configured to perform any of the steps of any of the embodiments performed by the wireless device. The wireless device also includes power supply circuitry configured to supply power to the wireless device.

Embodiment 19: A base station for communicating a Quality of Experience (QoE) measurement(s) based on Radio Resource Control (RRC) segmentation is provided. The base station includes processing circuitry configured to perform any of the steps of any of the embodiments performed by the base station. The base station also includes power supply circuitry configured to supply power to the base station.

Embodiment 20: A User Equipment, UE, for communicating a Quality of Experience (QoE) measurement(s) based on Radio Resource Control (RRC) segmentation is provided. The UE includes an antenna configured to send and receive wireless signals; radio front-end circuitry connected to the antenna and to processing circuitry and configured to condition signals communicated between the antenna and the processing circuitry. The processing circuitry being configured to perform any of the steps of any of the embodiments performed by the wireless device. The UE also includes an input interface connected to the processing circuitry and configured to allow input of information into the UE to be processed by the processing circuitry, an output interface connected to the processing circuitry and configured to output information from the UE that has been processed by the processing circuitry, and a battery connected to the processing circuitry and configured to supply power to the UE.

Embodiment 21: A communication system including a host computer comprising: processing circuitry configured to provide user data and a communication interface configured to forward the user data to a cellular network for transmission to a User Equipment, UE. The cellular network comprises a base station having a radio interface and processing circuitry, the base station's processing circuitry configured to perform any of the steps of any of the embodiments performed by the base station.

Embodiment 22: The communication system further including the base station.

Embodiment 23: The communication system further including the UE, wherein the UE is configured to communicate with the base station.

Embodiment 24: The communication system, wherein: the processing circuitry of the host computer is configured to execute a host application, thereby providing the user data; and the UE comprises processing circuitry configured to execute a client application associated with the host application.

Embodiment 25: A method implemented in a communication system including a host computer, a base station, and a User Equipment, UE. The method includes at the host computer, providing user data. The method also includes at the host computer, initiating a transmission carrying the user data to the UE via a cellular network comprising the base station, wherein the base station performs any of the steps of any of the embodiments performed by the base station.

Embodiment 26: The method also includes at the base station, transmitting the user data.

Embodiment 27: The user data is provided at the host computer by executing a host application, the method further comprising, at the UE, executing a client application associated with the host application.

Embodiment 28: A User Equipment, UE, configured to communicate with a base station, the UE comprising a radio interface and processing circuitry configured to perform the method of the previous 3 embodiments.

Embodiment 29: A communication system including a host computer comprising: processing circuitry configured to provide user data and a communication interface configured to forward user data to a cellular network for transmission to a User Equipment, UE. The UE comprises a radio interface and processing circuitry, the UE's components configured to perform any of the steps of any of the embodiments performed by the wireless device.

Embodiment 30: The cellular network further includes a base station configured to communicate with the UE.

Embodiment 31: The processing circuitry of the host computer is configured to execute a host application, thereby providing the user data. The UE's processing circuitry is configured to execute a client application associated with the host application.

Embodiment 32: A method implemented in a communication system including a host computer, a base station, and a User Equipment, UE. The method includes at the host computer, providing user data. The method also includes at the host computer, initiating a transmission carrying the user data to the UE via a cellular network comprising the base station, wherein the UE performs any of the steps of any of the embodiments performed by the wireless device.

Embodiment 33: The method of the previous embodiment, further comprising at the UE, receiving the user data from the base station.

Embodiment 34: A communication system including a host computer comprising communication interface configured to receive user data originating from a transmission from a User Equipment, UE, to a base station. The UE comprises a radio interface and processing circuitry, the UE's processing circuitry configured to perform any of the steps of any of the embodiments performed by the wireless device.

Embodiment 35: The communication system of the previous embodiment, further including the UE.

Embodiment 36: The communication system of the previous two embodiments, further including the base station, wherein the base station comprises a radio interface configured to communicate with the UE and a communication interface configured to forward to the host computer the user data carried by a transmission from the UE to the base station.

Embodiment 37: The communication system of the previous three embodiments, wherein: the processing circuitry of the host computer is configured to execute a host application; and the UE's processing circuitry is configured to execute a client application associated with the host application, thereby providing the user data.

Embodiment 38: The communication system of the previous four embodiments, wherein: the processing circuitry of the host computer is configured to execute a host application, thereby providing request data; and the UE's processing circuitry is configured to execute a client application associated with the host application, thereby providing the user data in response to the request data.

Embodiment 39: A method implemented in a communication system including a host computer, a base station, and a User Equipment, UE. The method includes at the host computer, receiving user data transmitted to the base station from the UE, wherein the UE performs any of the steps of any of the embodiments performed by the wireless device.

Embodiment 40: The method of the previous embodiment, further comprising, at the UE, providing the user data to the base station.

Embodiment 41: The method of the previous two embodiments, further comprising: at the UE, executing a client application, thereby providing the user data to be transmitted; and at the host computer, executing a host application associated with the client application.

Embodiment 42: The method of the previous three embodiments, further comprising: at the UE, executing a client application; and at the UE, receiving input data to the client application, the input data being provided at the host computer by executing a host application associated with the client application. The user data to be transmitted is provided by the client application in response to the input data.

Embodiment 43: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the embodiments performed by the base station.

Embodiment 44: The communication system of the previous embodiment further including the base station.

Embodiment 45: The communication system of the previous two embodiments, further including the UE, wherein the UE is configured to communicate with the base station.

Embodiment 46: The communication system of the previous three embodiments, wherein: the processing circuitry of the host computer is configured to execute a host application; and the UE is configured to execute a client application associated with the host application, thereby providing the user data to be received by the host computer.

Embodiment 47: A method implemented in a communication system including a host computer, a base station, and a User Equipment, UE. The method includes at the host computer, receiving, from the base station, user data originating from a transmission which the base station has received from the UE, wherein the UE performs any of the steps of any of the embodiments performed by the wireless device.

Embodiment 48: The method of the previous embodiment, further comprising at the base station, receiving the user data from the UE.

Embodiment 49: The method of the previous two embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
CN Core Network
CPU Central Processing Unit
DL Downlink
DN Data Network
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station Distributed Unit
HSS Home Subscriber Server
IoT Internet of Things
IP Internet Protocol
LTE Long Term Evolution
MME Mobility Management Entity
MTC Machine Type Communication
NEF Network Exposure Function
NF Network Function
NR New Radio
NRF Network Function Repository Function
NSSF Network Slice Selection Function
OAM Operations, Administration, and Management
OTT Over-the-Top
PC Personal Computer
PCF Policy Control Function
PDCP Packet Data Convergence Protocol
P-GW Packet Data Network Gateway
QoE Quality of Experience
QoS Quality of Service
RAM Random Access Memory
RAN Radio Access Network
RAT Radio Access Technology
ROM Read Only Memory
RRC Radio Resource Control
RRH Remote Radio Head
RU Round Trip Time
SCEF Service Capability Exposure Function
SMF Session Management Function
TCE Trace Collector Entity
UDM Unified Data Management
UE User Equipment
UPF User Plane Function
UP Uplink
UMTS Universal Mobile Telecommunications System Those skilled in the art will recognize improvements and modifications to the embodiments of the present disclosure. All such improvements and modifications are considered within the scope of the concepts disclosed herein.

The invention claimed is:

1. A method performed by a wireless device for communicating a Quality of Experience (QoE) measurement, comprising:
   receiving, from at least one network node, an explicit indication that indicates whether the at least one network node supports Radio Resource Control (RRC) segmentation, wherein the explicit indication comprises one or more of:
      an indication received inside a QE configuration container; and
      an indication received outside the QoE configuration container and in a message used by the at least one network node to send a QoE measurement configuration to the wireless device; and
   transmitting, to the at least one network node, the QoE measurement based on the RRC segmentation in response to receiving the explicit indication that indicates the at least one network node supports the RRC segmentation.

2. The method of claim 1, wherein receiving the explicit indication comprises forwarding the indication received outside the QoE configuration container from an access stratum layer in the wireless device to an application layer in the wireless device.

3. The method of claim 1, wherein:
receiving the explicit indication from the at least one network node further comprises receiving the explicit indication from a first network node that indicates the first network node supports the RRC segmentation; and
transmitting the QoE measurement to the at least one network node further comprises transmitting the QoE measurement to a second network node based on the RRC segmentation.

4. The method of claim 1, wherein transmitting the QoE measurement comprises one or more of:
determining a permitted size of the QoE measurement; and
truncating the QoE measurement to the permitted size.

5. The method of claim 4, wherein a subset of QoE measurement comprises one of:
a latest acquired QoE measurement; and
a specific type of the QoE measurement.

6. The method of claim 1, wherein transmitting the QoE measurement comprises one or more of:
employing a QoE measurement buffer of a first size if the explicit indication indicates that the at least one network node supports the RRC segmentation; and
employing the QoE measurement buffer of a second size smaller than the first size if the explicit indication indicates that the at least one network node does not support the RRC segmentation indicating an adjustment to a size of the QoE measurement buffer from an access stratum layer in the wireless device to an application layer in the wireless device.

7. The method of claim 1, wherein transmitting the QoE measurement comprises one or more of:
discarding the QoE measurement in response to a contradiction related to transmitting the QoE measurement based on the RRC segmentation;
transmitting a subset of the QoE measurement in response to the contradiction related to transmitting the QoE measurement based on the RRC segmentation; and
storing the QoE measurement in response to the contradiction related to transmitting the QoE measurement based on the RRC segmentation.

8. A wireless device, comprising:
processing circuitry configured to cause the wireless device to:
receive, from at least one network node, an explicit indication that indicates whether the at least one network node supports Radio Resource Control (RRC) segmentation, wherein the explicit indication comprises one or more of:
an indication received inside a Quality of Experience (QoE) configuration container; and
an indication received outside the QoE configuration container and in a message used by the at least one network node to send a QoE measurement configuration to the wireless device; and
transmit, to the at least one network node, a QoE measurement based on the RRC segmentation in response to receiving the explicit indication that indicates the at least one network node supports the RRC segmentation; and
power supply circuitry configured to supply power to the wireless device.

9. A method performed by a base station for communicating a Quality of Experience (QoE) measurement, comprising:
transmitting, to a wireless device, an explicit indication that indicates whether the base station supports Radio Resource Control (RRC) segmentation, wherein the explicit indication comprises one or more of:
an indication received inside a QoE configuration container; and
an indication received outside the QoE configuration container and in a message used by the at least one network node to send a QoE measurement configuration to the wireless device; and
receiving, from the wireless device, the QoE measurement based on the RRC segmentation in response to transmitting the indication that indicates the base station supports the RRC segmentation.

10. The method of claim 9, wherein transmitting the indication to the wireless device further comprises providing an explicit indication to indicate a permitted size of the QoE measurement and/or a number of permitted RRC segments.

11. A base station, comprising:
processing circuitry configured to cause the base station to:
transmit, to a wireless device, an indication that indicates whether the base station supports Radio Resource Control (RRC) segmentation, wherein the explicit indication comprises one or more of:
an indication received inside a Quality of Experience (QoE) configuration container;
an indication received outside the QoE configuration container and in a message used by at least one network node to send the QoE measurement configuration to the wireless device; and
receive, from the wireless device, a QoE measurement based on the RRC segmentation in response to transmitting the explicit indication that indicates the base station can support the RRC segmentation; and
power supply circuitry configured to supply power to the base station.

* * * * *